(12) United States Patent
Nishioka et al.

(10) Patent No.: US 10,473,207 B2
(45) Date of Patent: Nov. 12, 2019

(54) OIL-DRAIN DEVICE FOR THRUST BEARING DEVICE AND TURBOCHARGER PROVIDED WITH THE SAME

(71) Applicant: MITSUBISHI HEAVY INDUSTRIES ENGINE & TURBOCHARGER, LTD., Sagamihara-shi, Kanagawa (JP)

(72) Inventors: Tadasuke Nishioka, Tokyo (JP); Yosuke Danmoto, Tokyo (JP); Isao Tomita, Tokyo (JP); Takashi Nambu, Tokyo (JP); Yoji Akiyama, Tokyo (JP); Yuya Kojima, Tokyo (JP); Tatsuya Ishizaki, Tokyo (JP); Seigi Yano, Tokyo (JP); Takaya Futae, Tokyo (JP); Motoki Ebisu, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 228 days.

(21) Appl. No.: 15/515,332

(22) PCT Filed: Dec. 18, 2014

(86) PCT No.: PCT/JP2014/083588
§ 371 (c)(1),
(2) Date: Mar. 29, 2017

(87) PCT Pub. No.: WO2016/098230
PCT Pub. Date: Jun. 23, 2016

(65) Prior Publication Data
US 2017/0276233 A1    Sep. 28, 2017

(51) Int. Cl.
*F16H 57/04*    (2010.01)
*F04D 29/056*    (2006.01)
(Continued)

(52) U.S. Cl.
CPC ......... *F16H 57/0409* (2013.01); *F01D 25/18* (2013.01); *F04D 29/056* (2013.01);
(Continued)

(58) Field of Classification Search
CPC .... F16H 57/0409; F01D 25/18; F04D 29/056; F16C 17/04; F16C 33/1025; F16C 2360/24; F02B 39/14; F05D 2220/40
See application file for complete search history.

(56) References Cited

U.S. PATENT DOCUMENTS 4,009,972 A * 3/1977 Sarle ..................... F01D 25/186
184/6.11
4,095,857 A * 6/1978 Palmer .................. F01D 25/186
184/6.11
(Continued)

FOREIGN PATENT DOCUMENTS

CN    103842667 A    6/2014
JP    60-116035 U    8/1985
(Continued)

OTHER PUBLICATIONS

Office Action effective May 2, 2018, issued with English Machine Translation to the corresponding CN Application No. 201480081991.9 with English Machine Translation.
(Continued)

*Primary Examiner* — William E Dondero
*Assistant Examiner* — Robert T Reese
(74) *Attorney, Agent, or Firm* — Birch, Stewart, Kolasch & Birch, LLP

(57) ABSTRACT

An oil-drain device for a thrust bearing includes: a rotor shaft; a collar member mounted to an outer periphery of the rotor shaft; a thrust bearing supporting the rotor shaft in an axial direction; and an oil-drain space forming member defining an oil-drain space through which lubricant oil
(Continued)

leaking from a sliding portion of the thrust bearing flows, between the thrust bearing and the oil-drain space forming member. The oil-drain space includes: an oil-drain channel defined between a first end surface of the thrust bearing and a first end surface of the oil-drain space forming member, surrounding the flange portion of the collar member; and an oil-drain port formed below the oil-drain channel, for discharging the lubricant oil flowing through the oil-drain channel outside the oil-drain space. The oil-drain space is configured to guide the lubricant oil flowing through the oil-drain channel to outside the oil-drain space via the oil-drain port, along a flow direction of the lubricant oil flowing through the oil-drain channel from an upstream side toward a downstream side in a rotational direction of the rotor shaft.

15 Claims, 15 Drawing Sheets

(51) Int. Cl.
| | | |
|---|---|---|
| *F16C 17/04* | (2006.01) | |
| *F01D 25/18* | (2006.01) | |
| *F16C 33/10* | (2006.01) | |
| *F02B 39/14* | (2006.01) | |

(52) U.S. Cl.
CPC .......... *F16C 17/04* (2013.01); *F16C 33/1025* (2013.01); *F16H 57/042* (2013.01); *F02B 39/14* (2013.01); *F05D 2220/40* (2013.01); *F16C 2360/24* (2013.01)

(56) References Cited

U.S. PATENT DOCUMENTS

| | | | | |
|---|---|---|---|---|
| 4,664,605 A * | 5/1987 | Asano | ................... | F01D 25/183 |
| | | | | 417/407 |
| 4,741,630 A * | 5/1988 | Oeynhausen | ........... | F01D 11/00 |
| | | | | 384/144 |
| 2010/0310366 A1 * | 12/2010 | Eguchi | ................... | F01D 25/168 |
| | | | | 415/229 |
| 2014/0233873 A1 | 8/2014 | Hayashi et al. | | |
| 2015/0086144 A1 * | 3/2015 | Moscetti | ............. | F16C 33/1085 |
| | | | | 384/282 |
| 2015/0125263 A1 * | 5/2015 | Grabowska | ............ | F16J 15/164 |
| | | | | 415/104 |
| 2016/0356283 A1 | 12/2016 | Futae et al. | | |
| 2017/0009810 A1 * | 1/2017 | Futae | ...................... | F02B 39/14 |
| 2017/0234213 A1 * | 8/2017 | Futae | ...................... | F02B 39/14 |
| | | | | 415/110 |

FOREIGN PATENT DOCUMENTS

| | | | |
|---|---|---|---|
| JP | 61-10936 U | 1/1986 | |
| JP | 61-107935 U | 7/1986 | |
| JP | 3-106135 U | 11/1991 | |
| JP | 6-42361 A | 2/1994 | |
| JP | 7-217440 A | 8/1995 | |
| JP | 11-2136 A | 1/1999 | |
| JP | 2000-265990 A | 9/2000 | |
| JP | 2002-349551 A | 12/2002 | |
| JP | 2013-185443 A | 9/2013 | |
| JP | 2014-101826 A | 6/2014 | |
| JP | 2014-149058 A | 8/2014 | |
| WO | WO 2015/128935 A1 | 9/2015 | |

OTHER PUBLICATIONS

English Translation of the Written Opinion of the International Searching Authority of PCT/JP2014/083588 dated May 3, 2017.
Extended European No. 14908440.2 Seach Report effective Oct. 2, 2017 issued to the corresponding EP Application No. 14908440.2.
Office Action effective Oct. 10, 2017 issued to the corresponding Japanese Application No. 2016-564533 with a Machine English Translation.
International Search Report, issued in PCT/JP2014/083588 (PCT/ISA/210), dated Apr. 7, 2015.

* cited by examiner

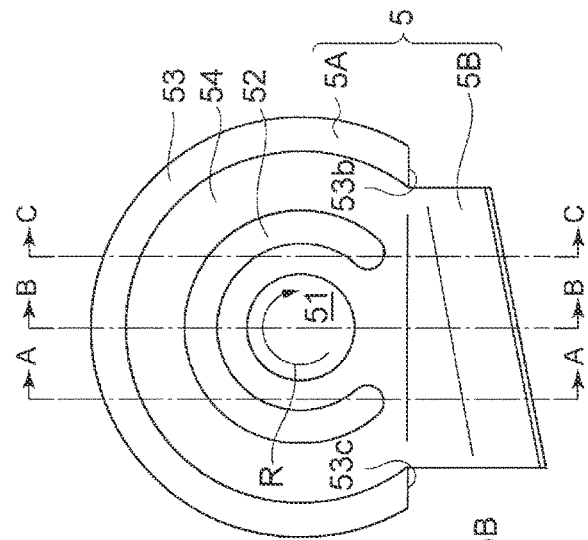
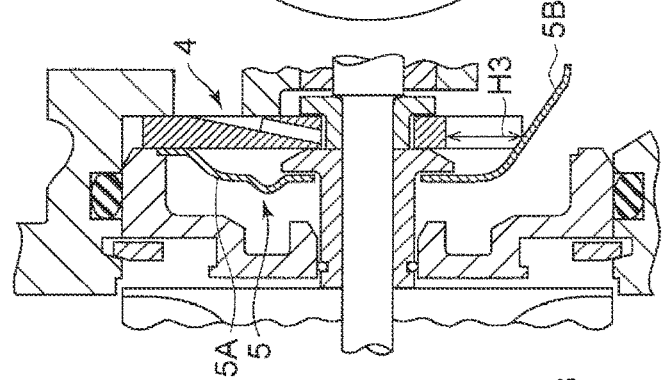
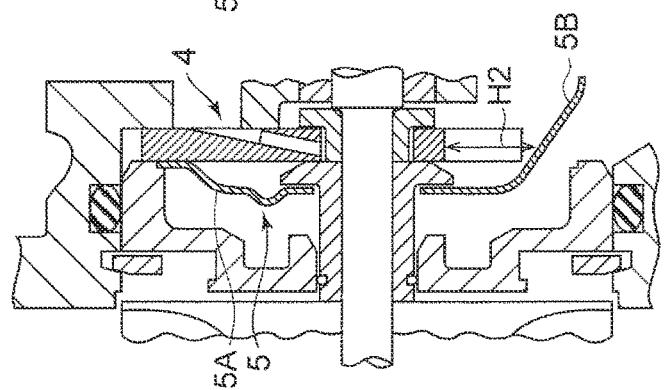
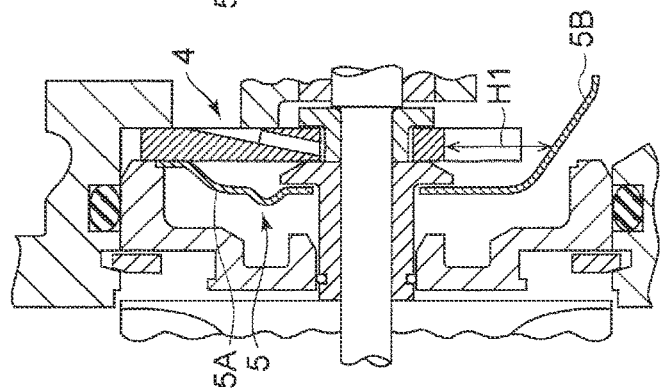

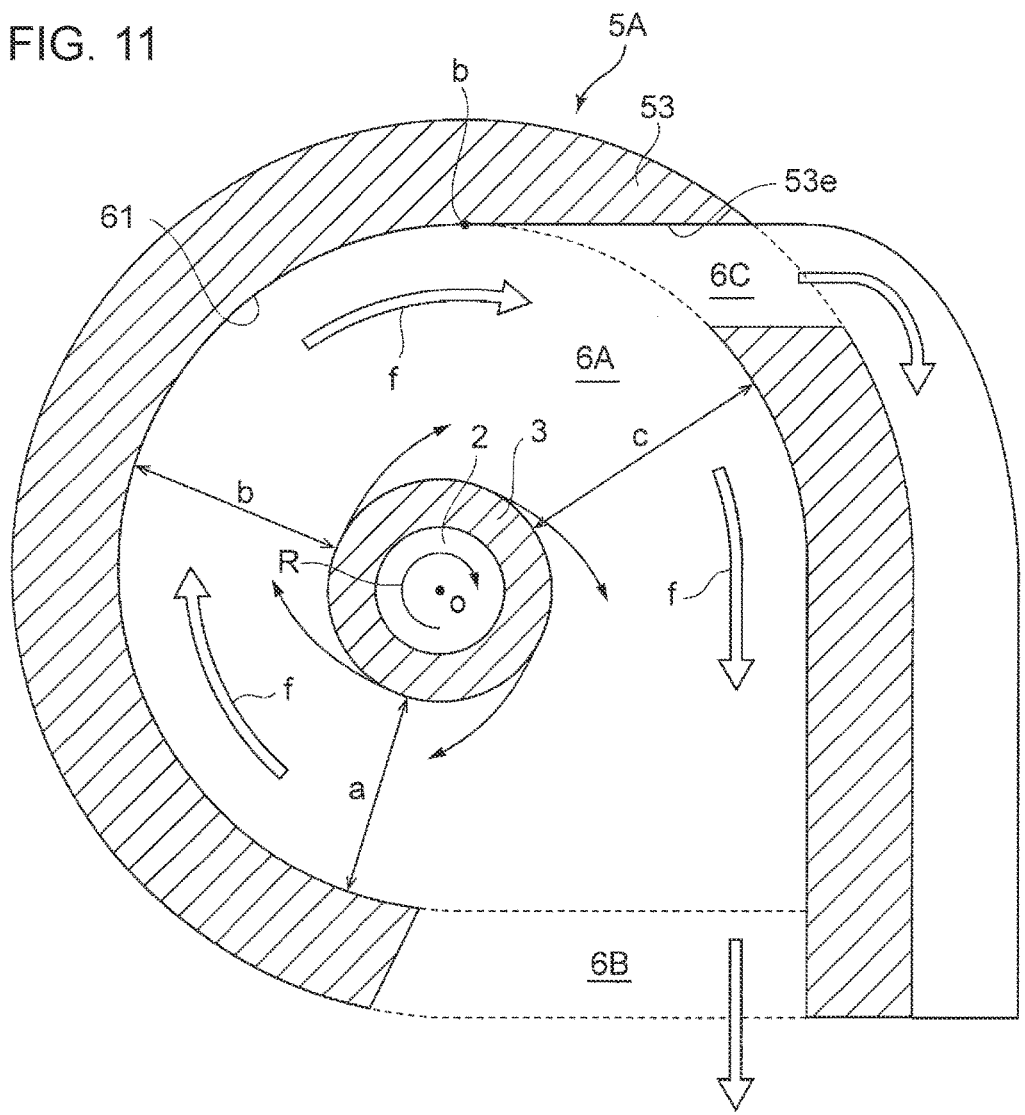

OIL-DRAIN DEVICE FOR THRUST BEARING DEVICE AND TURBOCHARGER PROVIDED WITH THE SAME

TECHNICAL FIELD

The present disclosure relates to an oil-drain device for a thrust bearing device and a turbocharger provided with the oil-drain device.

BACKGROUND ART

As a technique to improve an output of an engine, known is a method which compresses intake air with a turbocharger and supplies an engine with the compressed intake air (supercharging). This method is widely used for automobile engines and the like. A turbocharger normally includes a rotary shaft, a turbine wheel disposed on an end side of the rotary shaft, and a compressor wheel disposed on the opposite end side of the rotary shaft. The rotary shaft rotates at a high speed in response to exhaust energy of exhaust gas being applied to the turbine wheel, and thereby the compressor wheel disposed on the opposite end side of the rotary shaft compresses intake air.

A force that moves the rotor shaft in the axial direction (thrust force) is applied to the rotor shaft of the turbocharger. Thus, the turbocharger includes a thrust bearing device for supporting the rotor shaft in the axial direction. As an example of such a thrust bearing device, Patent Document 1 discloses a thrust bearing device.

The thrust bearing device of Patent Document 1 is, as depicted in FIGS. 1 and 2 of the document, provided with a collar member (thrust bush 10) mounted to the outer periphery of the rotor shaft so as to be rotatable with the rotor shaft, and a thrust bearing (thrust disc 11) with an inner peripheral edge portion in engagement with an annular groove formed by the collar member. The thrust bearing has an outer peripheral edge portion fixed to the housing, and makes slide contact with the collar member that rotates with the rotor shaft at an inner peripheral edge portion, thereby receiving a thrust force that acts on the rotor shaft.

Lubricant oil is supplied to a sliding portion of the thrust bearing that makes slide contact with the collar member. Further, an oil deflector (deflector) 18 is disposed on an end surface of the thrust bearing, and an oil-drain space (the first chamber 20) is defined between the end surface of the thrust bearing and the oil deflector 18. The oil-drain space is formed so as to surround the periphery of the sliding portion of the thrust bearing. The oil deflector 18 has a function to collect lubricant oil that scatters from the sliding portion in accordance with rotation of the rotor shaft, and to discharge the collected lubricant oil to outside through an oil discharge port 24 formed below the oil-drain space.

CITATION LIST

Patent Literature

Patent Document 1: JPH11-2136A

SUMMARY

Problems to be Solved

When the flow rate of lubricant oil increases during high-speed rotation, for instance, the amount of lubricant oil that flows into the oil-drain space increases, which may prevent smooth discharge of lubricant oil through the oil-drain port and bring about accumulation of lubricant oil inside the oil-drain space. When lubricant oil accumulates inside the oil-drain space, the air-liquid boundary surface of the lubricant oil may make contact with the collar member, which may cause stirring loss and deteriorate the performance of the turbocharger.

In this regard, with the thrust bearing device in patent Document 1, the area center of the oil-drain port is disposed upstream in the rotational direction of the vertical axis that passes through the rotational center of the rotor shaft, which promotes discharge of lubricant oil through the oil-drain port. However, even with the thrust bearing device 1 of Patent Document 1, lubricant oil still may fail to be discharged smoothly through the oil-drain port and accumulate inside the oil-drain space.

The present invention was made under the above described conditions in the related art, and an object of at least one embodiment of the present invention is to provide an oil-drain device for a thrust bearing capable of smoothly discharging lubricant oil that is supplied to the thrust bearing, and a turbocharger having the same.

Solution to the Problems (1) An oil-drain device for a thrust bearing according to at least one embodiment of the present invention comprises: a rotor shaft; a collar member to be mounted to an outer periphery of the rotor shaft so as to be rotatable with the rotor shaft, the collar member having a collar body portion having a cylindrical shape and a flange portion formed to have a larger diameter than the collar body portion; a thrust bearing having an insertion hole into which the rotor shaft is inserted, the thrust bearing being configured to make slide contact with a first end surface of the flange portion of the collar member to support the rotor shaft which rotates in a state of being inserted into the insertion hole in an axial direction; an oil-supply channel for supplying lubricant oil to a sliding portion of the thrust bearing which makes slide contact with the first end surface of the flange portion; and an oil-drain space forming member disposed on a side of a first end surface of the thrust bearing, the oil-drain space forming member defining an oil-drain space through which the lubricant oil leaking from the sliding portion of the thrust bearing flows, between the thrust bearing and the oil-drain space forming member. The oil-drain space includes: an oil-drain channel defined between the first end surface of the thrust bearing and a first end surface of the oil-drain space forming member, the oil-drain channel surrounding the flange portion of the collar member; and an oil-drain port formed below the oil-drain channel, for discharging the lubricant oil flowing through the oil-drain channel outside the oil-drain space. The oil-drain space is configured to guide the lubricant oil flowing through the oil-drain channel to outside the oil-drain space via the oil-drain port, along a flow direction of the lubricant oil flowing through the oil-drain channel from an upstream side toward a downstream side in a rotational direction of the rotor shaft.

With the above oil-drain device for a thrust bearing (1), an oil-drain space is defined between the thrust bearing to be in slide contact with the collar member that rotates together with the rotor shaft and the oil-drain space forming member disposed on an end surface side of the thrust bearing. Lubricant oil that leaks out from the sliding portion of the thrust bearing flows through the oil-drain space. The oil-drain space is configured so as to guide lubricant oil flowing through the oil-drain channel outside the oil-drain space via the oil-drain port, along a flow direction of lubricant oil flowing through the oil-drain channel from the upstream side toward the downstream side of the rotational direction of the rotor shaft.

With the above oil-drain device for a thrust bearing, lubricant oil supplied to the thrust bearing is smoothly discharged from the oil-drain space, and thus lubricant oil does not accumulate inside the oil-drain space. Thus, it is possible to reduce the risk of occurrence of stirring loss due to contact between the collar member and the gas-liquid boundary surface of lubricant oil.

(2) In some embodiments, in the oil-drain device for a thrust bearing according to the above (1), the oil-drain space forming member at least comprises a body portion having: a center hole into which the collar body portion of the collar member mounted to the rotor shaft is inserted; an inner peripheral edge portion which makes slide contact with a second end surface of the flange portion of the collar member at a radially outer side of the center hole; an intermediate portion formed on a radially outer side of the inner peripheral edge portion, with a gap from the first end surface of the thrust bearing; and an outer peripheral edge portion configured to make contact with the first end surface of the thrust bearing at a radially outer side of the intermediate portion. The oil-drain port is formed by a portion at a lower end of the body portion, the portion not having the outer peripheral edge portion formed thereon. The outer peripheral edge portion includes a linear portion extending from a predetermined position upstream of the oil-drain port in the rotational direction to the oil-drain port, along a tangent direction at the predetermined position. The linear portion is configured to guide the lubricant oil flowing through the oil-drain channel outside the oil-drain space via the oil-drain port along the flow direction.

Lubricant oil that flows through the oil-drain channel flows mainly along the outer peripheral edge of the oil-drain channel, due to a centrifugal force generated in association with rotation of the rotor shaft. Thus, with the above configuration (2), the outer peripheral edge portion forming an outer peripheral edge of the oil-drain channel has the linear portion disposed along the tangent direction at a predetermined position that is upstream of the oil-drain port in the rotational direction, extending from the predetermined position to the oil-drain port, whereby it is possible to guide lubricant oil that flows through the oil-drain channel to the oil-drain port along the linear portion smoothly.

(3) In some embodiments, the oil-drain device for a thrust bearing according to the above (2) further comprises a retainer disposed on a side of a second end surface of the oil-drain space forming member, and configured to retain the oil-drain space forming member and the thrust bearing on a radially outer side of the rotor shaft. The retainer includes an inclined surface below the oil-drain port, the inclined surface extending obliquely downward toward the thrust bearing.

With the above configuration (3), lubricant oil discharged from the oil-drain port downward flows along the inclined surface of the retainer to be guided outside the bearing housing. Thus, it is unnecessary to from a tongue portion or the like on the oil-drain space forming member to guide lubricant oil discharged from the oil-drain port to outside the bearing housing, and thereby it is possible to simplify the shape of the oil-drain space forming member and the thrust bearing.

(4) In some embodiments, in the oil-drain device for a thrust bearing according to any one of the above (1) to (3), the oil-drain space forming member comprises: a body portion having: a center hole into which the collar body portion of the collar member mounted to the rotor shaft is inserted; an inner peripheral edge portion which makes slide contact with a second end surface of the flange portion of the collar member at a radially outer side of the center hole; an intermediate portion formed on a radially outer side of the inner peripheral edge portion, with a gap from the first end surface of the thrust bearing; and an outer peripheral edge portion configured to make contact with the first end surface of the thrust bearing at a radially outer side of the intermediate portion; and a tongue portion extending obliquely downward from a lower end of the body portion toward the thrust bearing. The oil-drain port is formed by a portion of the lower end of the body portion, the portion not having the outer peripheral edge portion formed thereon. The tongue portion is formed to incline downward from a side of a downstream edge toward an upstream edge of the outer peripheral edge portion in a front view. The tongue portion is configured to guide the lubricant oil flowing through the oil-drain channel outside the oil-drain space via the oil-drain port along the flow direction.

The oil-drain space forming member includes the body portion defining the oil-drain space between the body portion and the thrust bearing, and the tongue portion extending obliquely downward from a lower end of the body portion toward the thrust bearing. The tongue portion guides lubricant oil discharged from the oil-drain port to outside the bearing housing. However, if the oil-drain space forming member includes the tongue portion, there is a risk of lubricant oil discharged from the oil-drain channel flowing along the surface of the tongue portion to return to the oil-drain channel without being discharged from the oil-drain port, due to the action of a centrifugal force of the rotor shaft.

Thus, with the above configuration (4), the tongue portion is formed to incline downward from the side of the downstream edge toward the side of the upstream edge of the outer peripheral edge portion in the front view, and thereby it is possible to reduce the amount of lubricant oil that returns to the oil-drain channel without being discharged from the oil-drain port.

(5) In some embodiments, in the oil-drain device for a thrust bearing according to any one of the above (2) to (4), the intermediate portion of the oil-drain space forming member includes a recessed portion configured such that a gap from the first end surface of the thrust bearing is greater at the recessed portion than at other part of the intermediate portion. The oil-drain channel includes an oil-drain groove 54d extending in a circumferential direction formed by the recessed portion 54a.

With the above configuration (5), the above described oil-drain channel includes the oil-drain groove extending in the circumferential direction formed by the recessed portion. Lubricant oil flowing through the oil-drain groove flows through the oil-drain channel without making contact with the collar member, and is discharged outside the oil-drain space through the oil-drain port. Thus, according to the present embodiment, as compared to a case where the oil-drain groove is not formed, it is possible to form the gas-liquid boundary surface of lubricant oil that flows through the oil-drain channel on the further outer side in the radial direction, which reduces the risk of occurrence of stirring loss between the lubricant oil and the collar member that rotates with the rotor shaft.

(6) In some embodiments, in the oil-drain device for a thrust bearing according to the above (5), the oil-drain space forming member further includes a plurality of guide plates disposed at intervals in a circumferential direction inside the oil-drain channel, for guiding the lubricant oil flowing through the oil-drain channel to the oil-drain groove.

According to the above configuration (6), the guide plates guide lubricant oil flowing through the oil-drain channel to the oil-drain groove. Accordingly, the amount of lubricant oil that flows through the oil-drain groove increases even further, and thereby it is possible to reduce the risk of occurrence of stirring loss between the lubricant oil and the collar member that rotates with the rotor shaft.

(7) In some embodiments, in the oil-drain device for a thrust bearing according to the above (6), the guide plates extend radially inward from a peripheral edge portion of the oil-drain space forming member. Leading edges of the guide plates are disposed closer to the thrust bearing than trailing edges of the guide plates. An intersection between each of the leading edges and the peripheral edge portion is positioned upstream, in the flow direction, of an intersection between a corresponding one of the trailing edges and the peripheral edge portion.

With the above configuration (7), it is possible to guide lubricant oil flowing through the oil-drain channel smoothly to the oil-drain groove along the flow direction f of the oil-drain channel. Accordingly, the amount of lubricant oil that flows through the oil-drain groove increases even further, and thereby it is possible to reduce the risk of occurrence of stirring loss between the lubricant oil and the collar member that rotates with the rotor shaft.

(8) In some embodiments, in the oil-drain device for a thrust bearing according to any one of the above (2) to (7), the oil-drain space forming member has a second oil-drain port communicating with the oil-drain channel and is configured such that the lubricant oil flowing through the oil-drain channel is discharged outside the oil-drain space via the second oil-drain port.

With the above configuration (8), lubricant oil flowing through the oil-drain channel is discharged also through the second oil-drain channel. Accordingly, it is possible to reduce the amount of lubricant oil that flows through the oil-drain channel, and thereby it is possible to prevent accumulation of lubricant oil inside the oil-drain space and to reduce the risk of occurrence of stirring loss between the lubricant oil and the collar member that rotates with the rotor shaft.

(9) In some embodiments, in the oil-drain device for a thrust bearing according to the above (8), the second oil-drain port has an opening which faces the flow direction of the lubricant oil flowing through the oil-drain channel, at an upper part of the oil-drain space forming member.

With the above configuration (9), lubricant oil flowing through the oil-drain channel is likely to meet at the second oil-drain port, and thus the amount of lubricant oil discharged from the second oil-drain port increases. Accordingly, it is possible to reduce the amount of lubricant oil that flows through the oil-drain channel. Thus, it is possible to prevent accumulation of lubricant oil inside the oil-drain space and to reduce the risk of occurrence of stirring loss between the lubricant oil and the collar member that rotates with the rotor shaft.

(10) In some embodiments, in the oil-drain device for a thrust bearing according to any one of the above (2) to (9), a groove portion extending in a circumferential direction is formed on the first end surface of the thrust bearing at a position radially outside an outer peripheral end surface of the flange portion. The first end surface of the thrust bearing comprises an outer first end surface disposed on a radially outer side of the groove portion and an inner first end surface disposed on a radially inner side of the groove portion, the outer first end surface protruding toward the oil-drain space forming member to be closer to the oil-drain space forming member than the inner first end surface.

According to the above configuration (10), lubricant oil that leaks outward in the radial direction from the sliding portion of the thrust bearing is guided to the groove portion formed on the first end surface of the thrust bearing. Lubricant oil flowing through the groove portion flows through the oil-drain channel without making contact with the collar member, and is discharged through the oil-drain port. Thus, according to the present embodiment, as compared to a case where the groove portion is not formed on the first end surface of the thrust bearing, it is possible to form the gas-liquid boundary surface of lubricant oil that flows through the oil-drain channel on the further outer side in the radial direction. Thus, it is possible to reduce the risk of occurrence of stirring loss between the lubricant oil and the collar member.

(11) In some embodiments, in the oil-drain device for a thrust bearing according to any one of the above (2) to (10), the oil-drain port is formed in an upstream region, in the rotational direction, of a center line extending in an upward and downward direction through a rotational center of the rotor shaft.

As described above, if the oil-drain space forming member includes the tongue portion, there is a risk of lubricant oil discharged from the oil-drain channel flowing along the surface of the tongue portion to return to the oil-drain channel without being discharged from the oil-drain port, due to the action of a centrifugal force of the rotor shaft.

With the above configuration (11), the oil-drain port is formed only in an upstream region of the center line in the rotational direction, and thereby it is possible to reduce the amount of lubricant oil that returns to the oil-drain channel without being discharged from the oil-drain port.

(12) In some embodiments, in the oil-drain device for a thrust bearing according to any one of the above (2) to (10), the oil-drain space forming member comprises: a body portion having: a center hole into which the collar body portion of the collar member mounted to the rotor shaft is inserted; an inner peripheral edge portion which makes slide contact with a second end surface of the flange portion of the collar member at a radially outer side of the center hole; an intermediate portion formed on a radially outer side of the inner peripheral edge portion, with a gap from the first end surface of the thrust bearing; and an outer peripheral edge portion configured to make contact with the first end surface of the thrust bearing at a radially outer side of the intermediate portion; and a tongue portion extending obliquely downward from a lower end of the body portion toward the thrust bearing. The oil-drain port is formed by a portion of the lower end of the body portion, the portion not having the outer peripheral edge portion formed thereon. The tongue portion includes a bend portion bended to close the oil-drain port in a downstream region, in the rotational direction, of the center line.

With the above configuration (12), the tongue portion has the bend portion that is bended to close the oil-drain port in a downstream region of the center line in the rotational direction. Thus, it is possible to reduce the amount of lubricant oil that returns to the oil-drain channel without being discharged from the oil-drain port.

(13) In some embodiments, in the oil-drain device for a thrust bearing according to any one of the above (2) to (12), the oil-drain channel is formed to have a flow-path cross sectional area which increases in the rotational direction from an upstream edge toward a downstream edge of the outer peripheral edge portion.

Lubricant oil that flows through the oil-drain channel increases in the flow rate toward the downstream side in the rotational direction. Thus, if the flow-path cross sectional area is small for the amount of lubricant oil, it forms a gas-liquid boundary surface of lubricant oil on the inner side in the radial direction, raising a risk of contact between the lubricant oil and the collar member.

In this regard, with the above configuration (13), the flow-path cross sectional area increases at the downstream side of the oil-drain channel where the amount of lubricant oil increases, and thereby it is possible to prevent contact between a gas-liquid boundary surface of lubricant oil and the collar member at the downstream side of oil-drain channel.

(14) In some embodiments, in the oil-drain device for a thrust bearing according to any one of the above (1) to (13), the oil-drain space forming member comprises an oil deflector formed from sheet metal.

According to the above configuration (14), the oil deflector made from sheet metal forms the oil-drain space forming member. Thus, the oil-drain space forming member can be easily processed as compared with a case in which the oil-drain space forming member is made from a casted insert member, for instance.

(15) A turbocharger according to at least one embodiment of the present invention comprises: a turbine impeller disposed on an end side of the rotor shaft; a compressor impeller disposed on another end side of the rotor shaft; and the oil-drain device for a thrust bearing according to any one of (1) to (14).

With the above configuration (15), it is possible to provide a turbocharger equipped with an oil-drain device for a thrust bearing capable of smoothly discharging lubricant oil that is supplied to the thrust bearing.

According to at least one embodiment of the present invention, it is possible to provide an oil-drain device for a thrust bearing capable of smoothly discharging lubricant oil that is supplied to the thrust bearing, and a turbocharger equipped with the same.

BRIEF DESCRIPTION OF DRAWINGS

FIG. 8 is a cross-sectional view of the oil-drain device of the thrust bearing depicted in FIG. 5.

FIG. 11 is a schematic diagram of an oil-drain space inside an oil-drain device of the thrust bearing according to an embodiment of the present invention.

DETAILED DESCRIPTION

Figure 1:
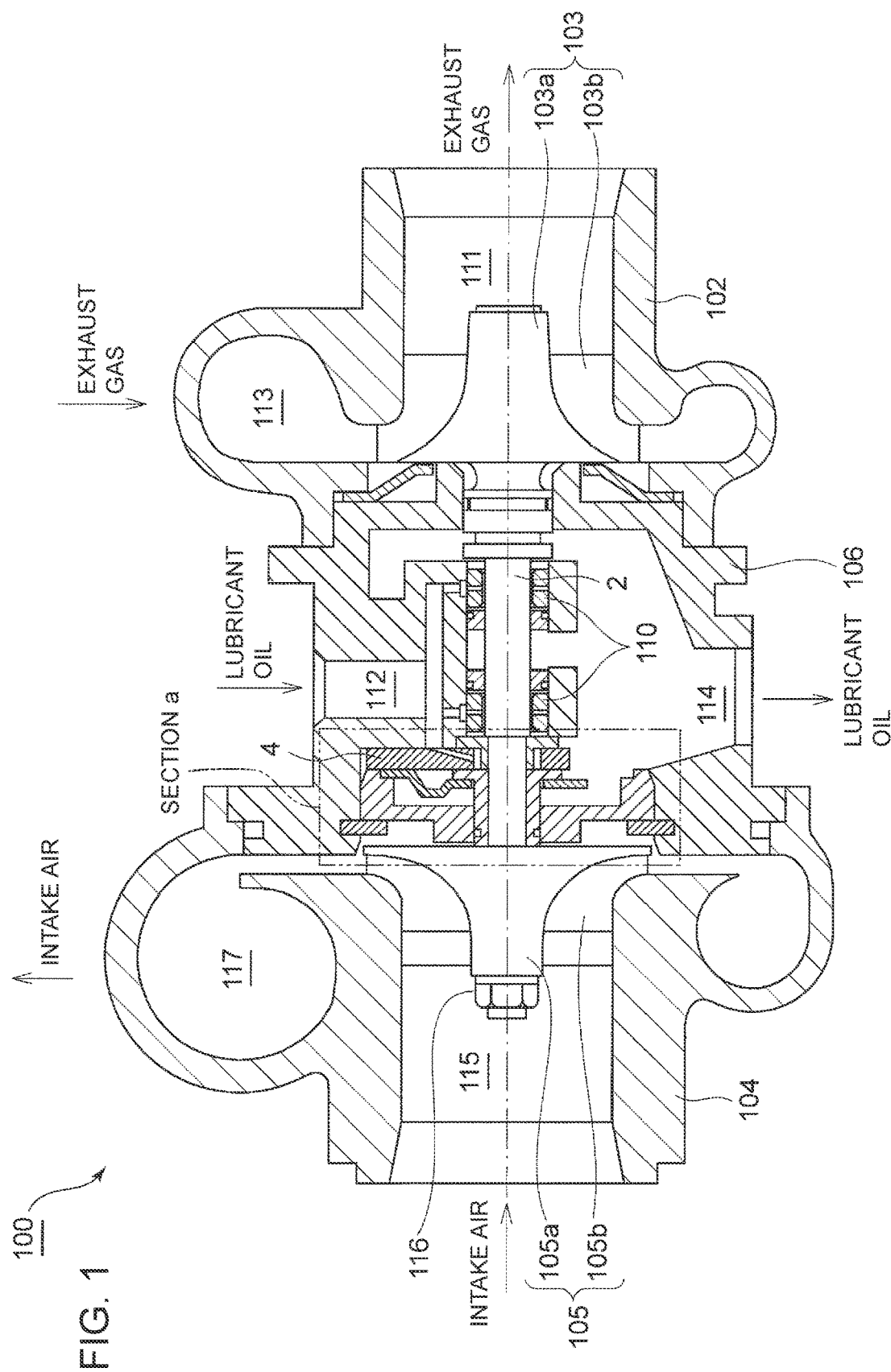
FIG. 1 is a cross-sectional view of a turbocharger according to an embodiment of the present invention, taken along the axial direction of the rotor shaft of the turbocharger.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

FIG. 1 is a cross-sectional view of a turbocharger according to an embodiment of the present invention, taken along the axial direction of the rotor shaft of the turbocharger.

The turbocharger according to an embodiment of the present invention is, though not particularly limited, a turbocharger to be mounted to an automobile engine, for instance.

As depicted in FIG. 1, the turbocharger 100 of the present embodiment includes three housings: a turbine housing 102 which accommodates a turbine impeller 103 disposed on one end side of a rotor shaft 2; a compressor housing 104 which accommodates a compressor impeller 105 disposed on the opposite end side of the rotor shaft 2; and a bearing housing 106 which accommodates a radial bearing 110 for rotatably supporting the rotor shaft 2 and a thrust bearing 4 for supporting a thrust force of the rotor shaft 2.

A turbine scroll passage 113 of a spiral shape is formed on an outer peripheral part of the turbine housing 102. The turbine impeller 103 is disposed at the center of the turbine scroll passage 113. The turbine impeller 103 includes a turbine hub 103a of a truncated conical shape, which is the shape of a conical member with its top portion cut off at a plane parallel to its bottom surface, and a plurality of turbine blades 103b protruding in a radial direction from a peripheral surface of the turbine hub 103a. The turbine hub 103a of the turbine impeller 103 is joined to an end portion of the rotor shaft 2 by, for instance, welding. Exhaust gas flows through the turbine scroll passage 113 to act on the turbine impeller 103, and exits the turbine housing 102 through an exhaust-gas outlet 111 which has an opening in the axial direction of the rotor shaft 2.

A compressor scroll passage 117 of a spiral shape is formed on an outer peripheral part of the compressor housing 104. The compressor impeller 105 is disposed at the center of the compressor scroll passage 117. The compressor impeller 105 includes a compressor hub 105a of a truncated conical shape, which is the shape of a conical member with its top portion cut off along a plane parallel to its bottom surface, and a plurality of compressor blades 105b protruding in a radial direction from a peripheral surface of the compressor hub 105a. An insertion hole (not depicted) is formed in the center of the compressor hub 105a of the compressor impeller 105, and the second end side of the rotor shaft 2 is to be fitted into the insertion hole. The first end side of the rotor shaft 2 is fitted through the insertion hole, and then a nut 116 is fastened from a tip of the compressor hub 105a, and thereby the compressor impeller 105 is fixed to the second end portion of the rotor shaft 2. Intake gas flows through an intake inlet 115 which has an opening in the axial direction of the rotor shaft 2, is compressed by the compressor impeller 105, and flows through the compressor scroll passage 117 to be supplied to an engine (not depicted).

The bearing housing 106 is coupled to the turbine housing 102 and to the compressor housing 104 at the opposite sides, and is disposed between the turbine housing 102 and the compressor housing 104. An interior space is defined inside the bearing housing 106 so that the rotor shaft 2 is insertable in the axial direction through the interior space, and the radial bearing 110 and the thrust bearing 4 described above are accommodated in the interior space. Further, an oil-inlet channel 112 for supplying lubricant oil to the radial bearing 110 and the thrust bearing 4 described above is formed on an upper part of the bearing housing 106. Lubricant oil taken into the bearing housing 106 through the oil-inlet channel 112 lubricates the radial bearing 110 and the thrust bearing 4, before being discharged outside the bearing housing 106 through an oil-outlet channel 114 formed on a lower part of the bearing housing 106, In such a turbocharger 100, formed in the section "a" depicted in FIG. 1 is an oil-drain device 1 for a thrust bearing, provided to discharge lubricant oil supplied to the thrust bearing 4 to the oil-outlet channel 114.

Figure 2:
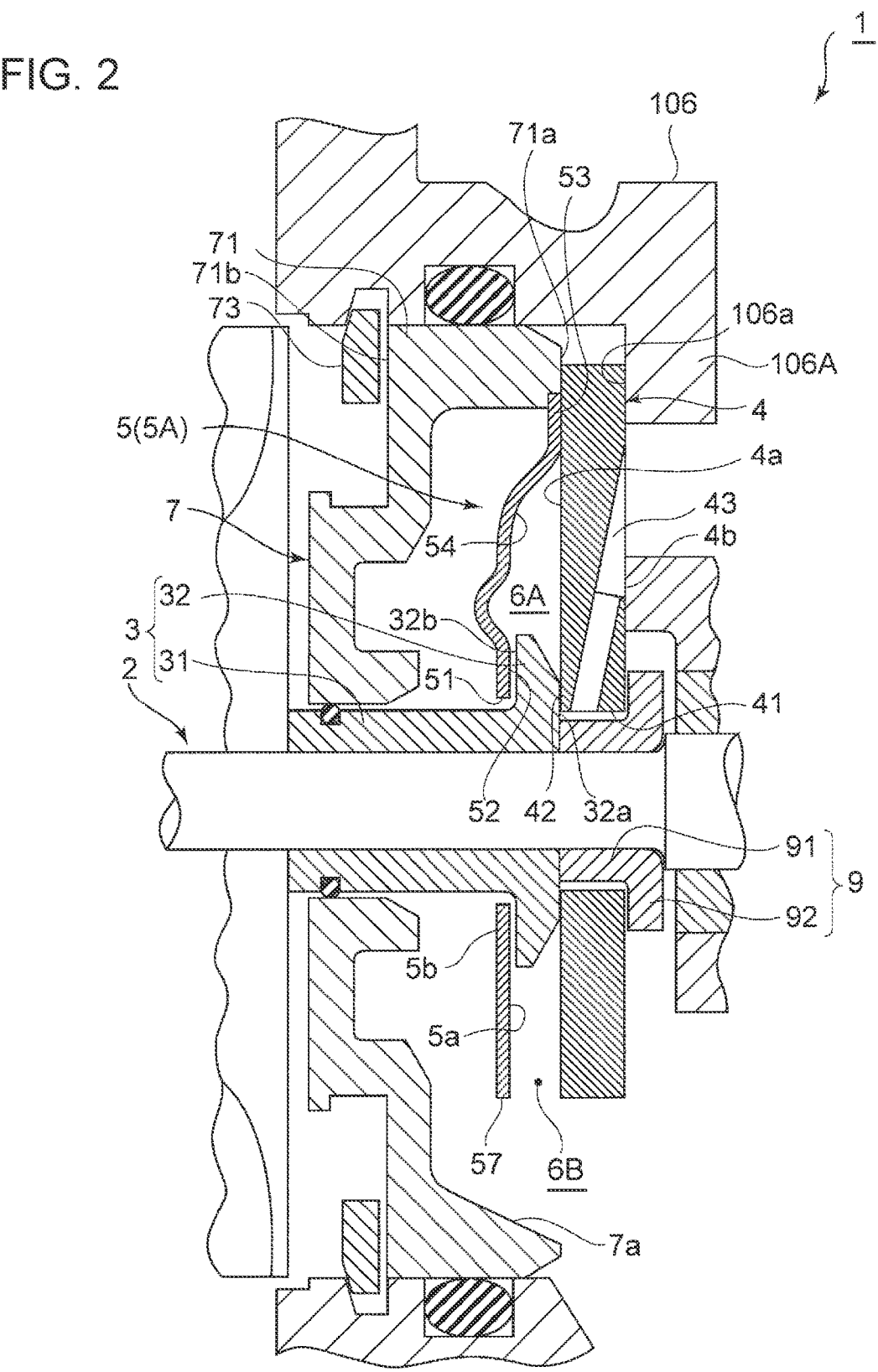
FIG. 2 is a partial enlarged view of section "a" in FIG. 1 and its peripheral structure, showing a cross-sectional view of an oil-drain device of a thrust bearing according to an embodiment of the present invention.
Figure 3:
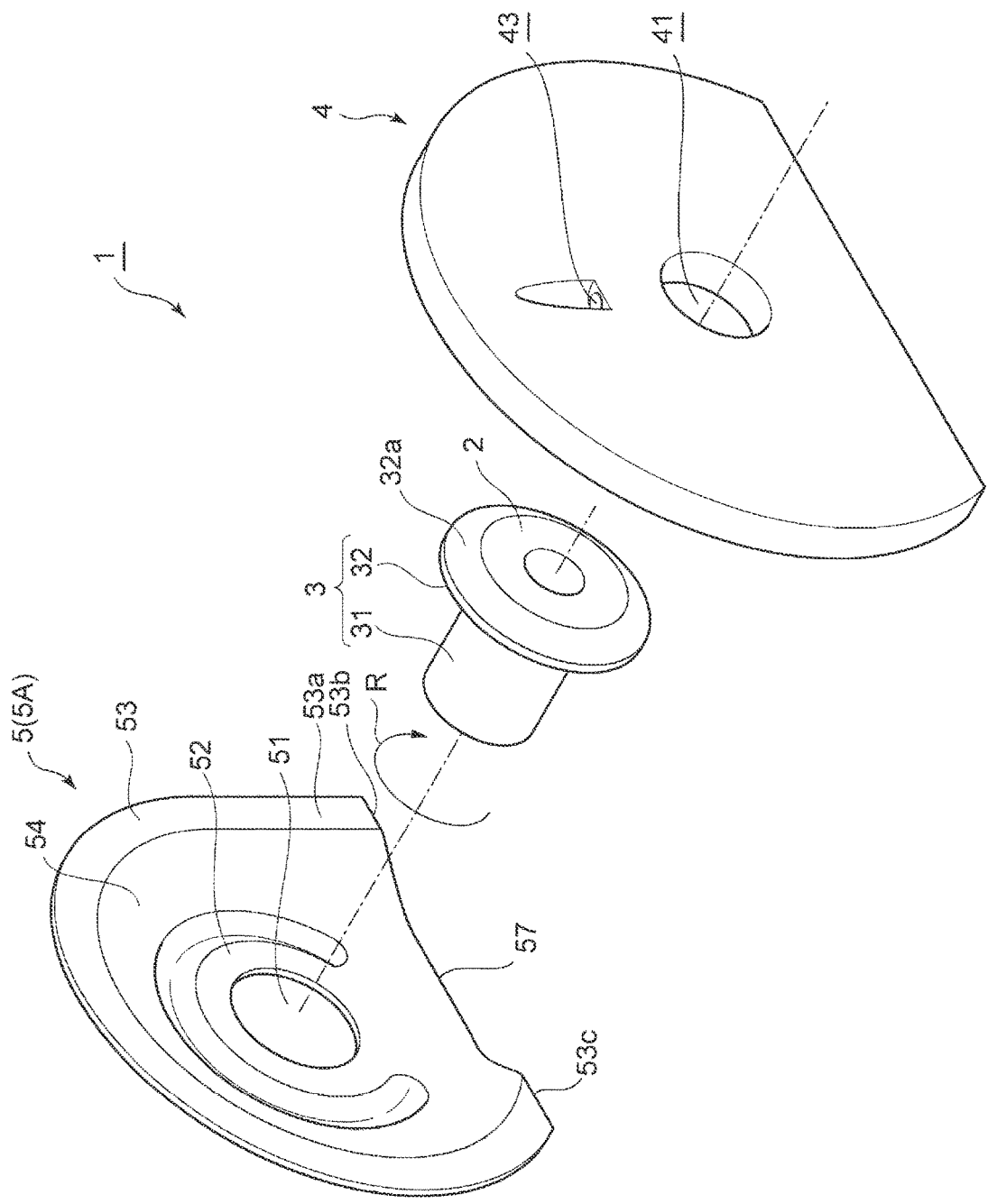
FIG. 3 is an exploded perspective view of the oil-drain device depicted in FIG. 2.
Figure 4:
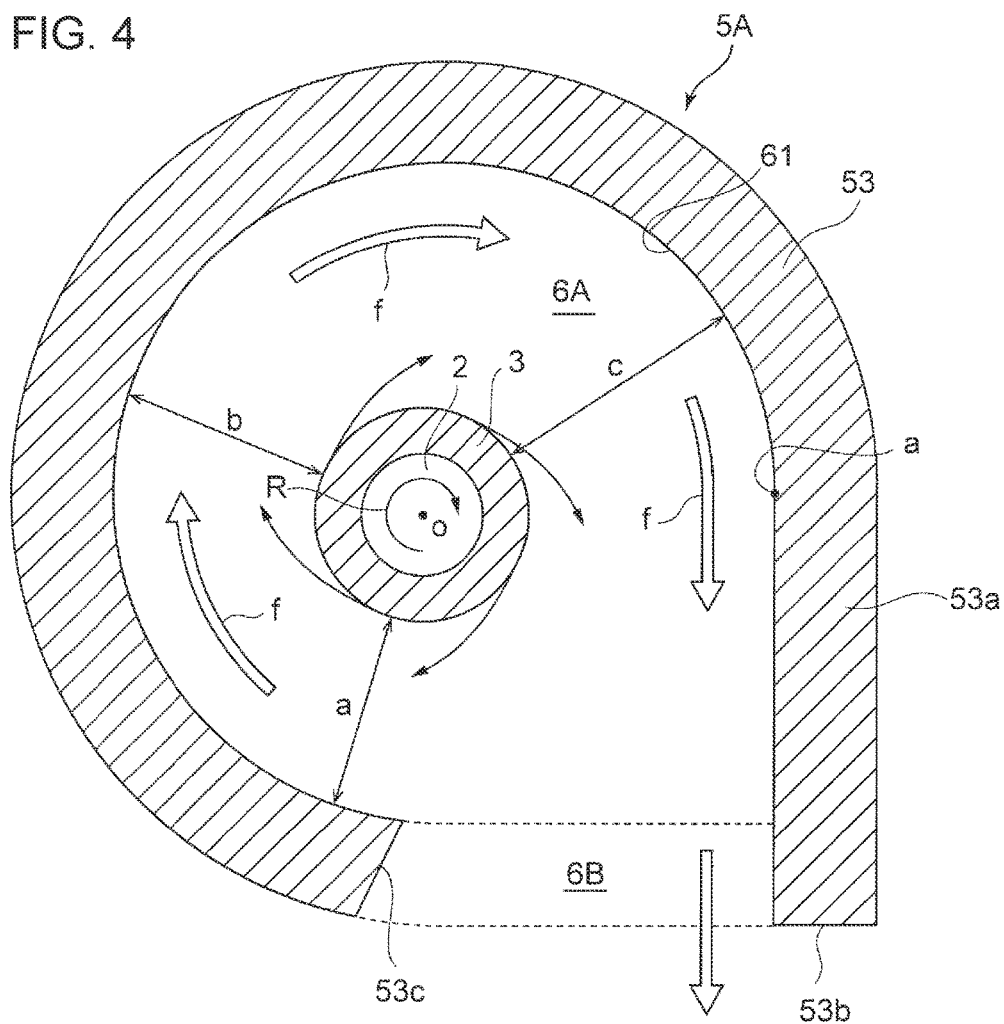
FIG. 4 is a schematic diagram of an oil-drain space inside the oil-drain device for a thrust bearing depicted in FIG. 2.
Figure 5:
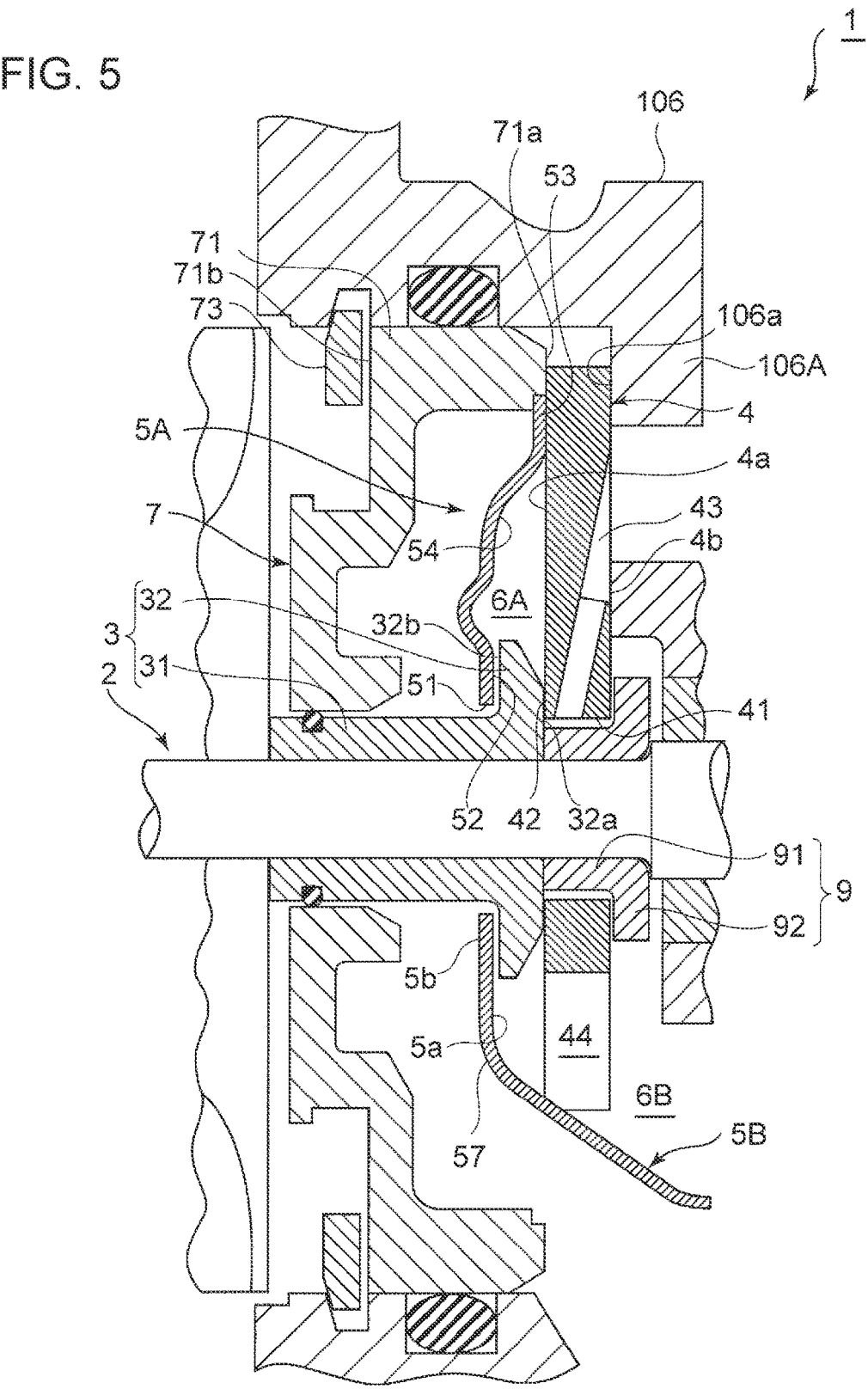
FIG. 5 is a partial enlarged view of section "a" in FIG. 1 and its peripheral structure, showing a cross-sectional view of an oil-drain device of a thrust bearing according to an embodiment of the present invention.
Figure 6:
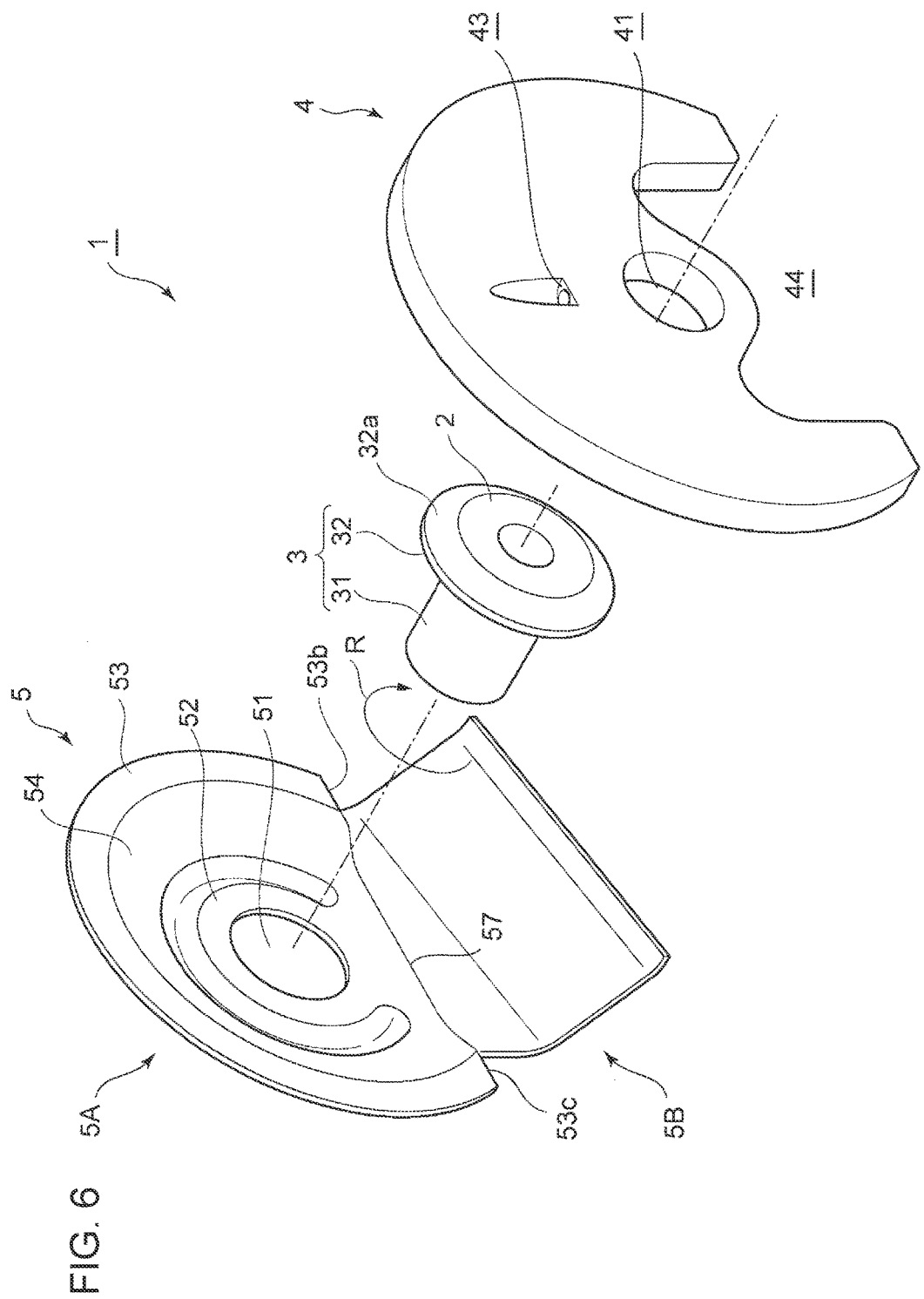
FIG. 6 is an exploded perspective view of the oil-drain device depicted in FIG. 5.
Figure 7:
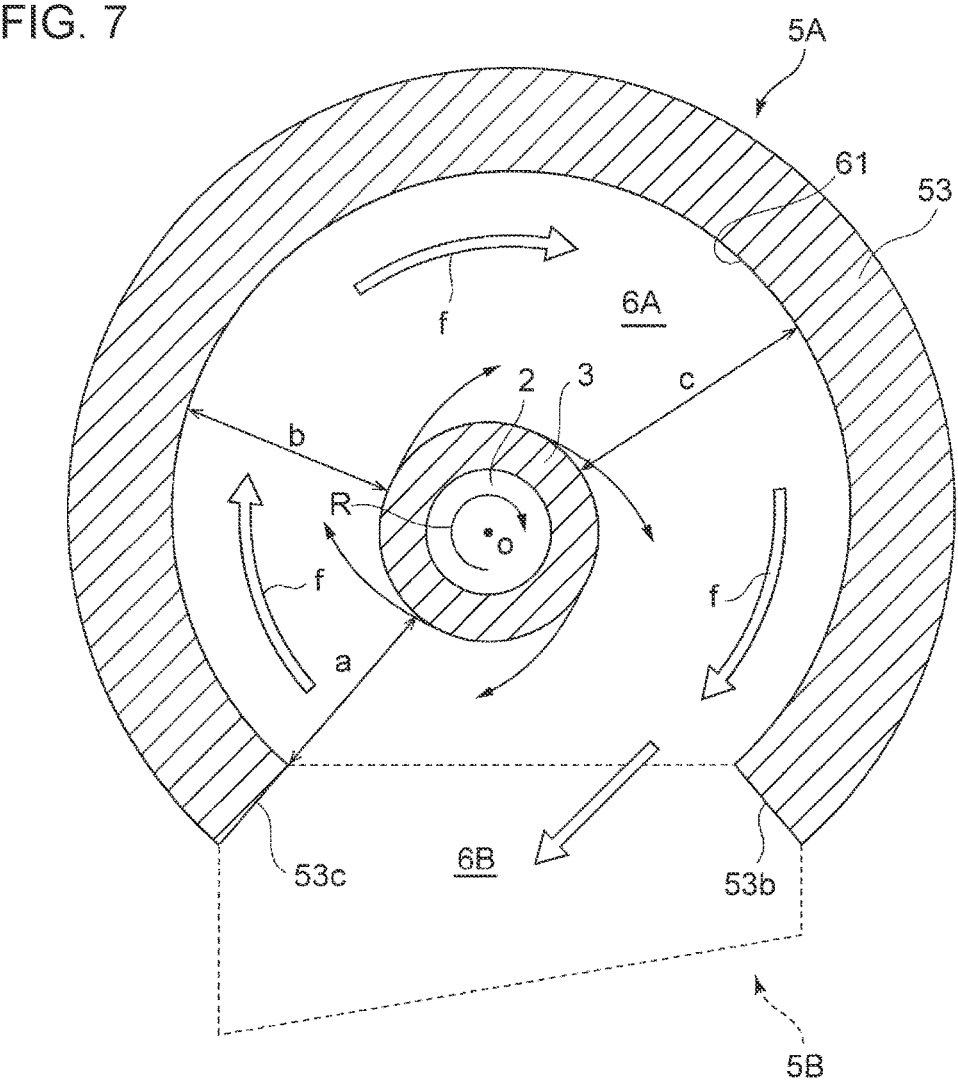
FIG. 7 is a schematic diagram of an oil-drain space inside the oil-drain device for a thrust bearing depicted in FIG. 5.
Figure 9A:
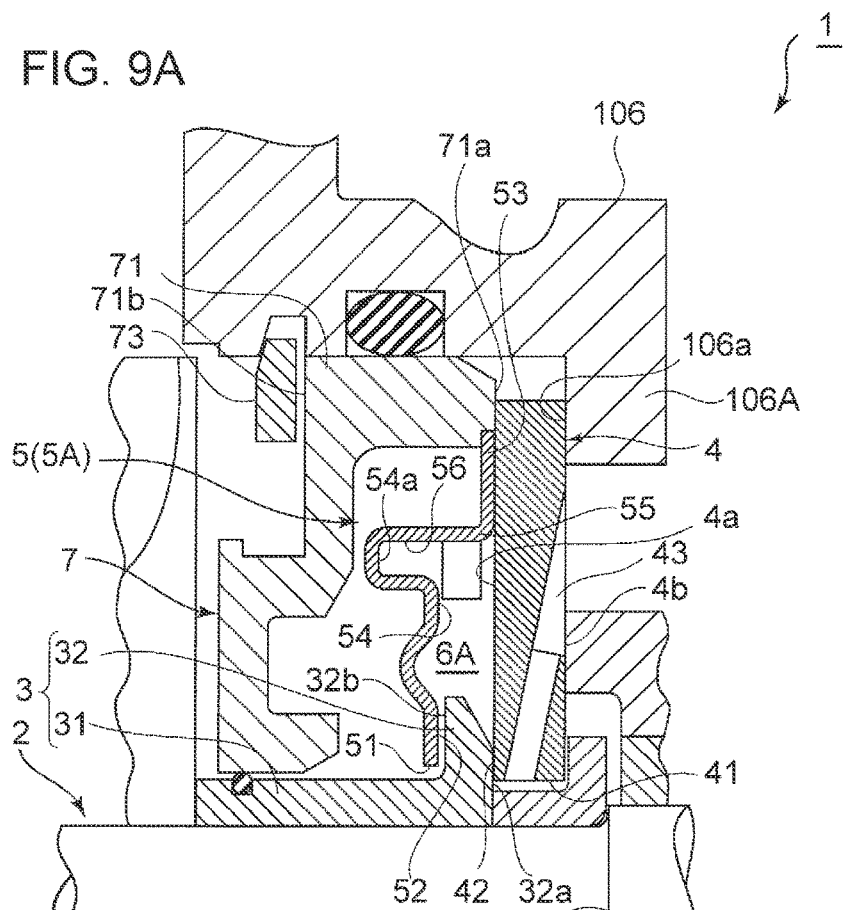
FIG. 9 is a partial enlarged view of section "a" in FIG. 1 and its peripheral structure, showing a cross-sectional view of an oil-drain device of a thrust bearing according to an embodiment of the present invention.
Figure 12A:
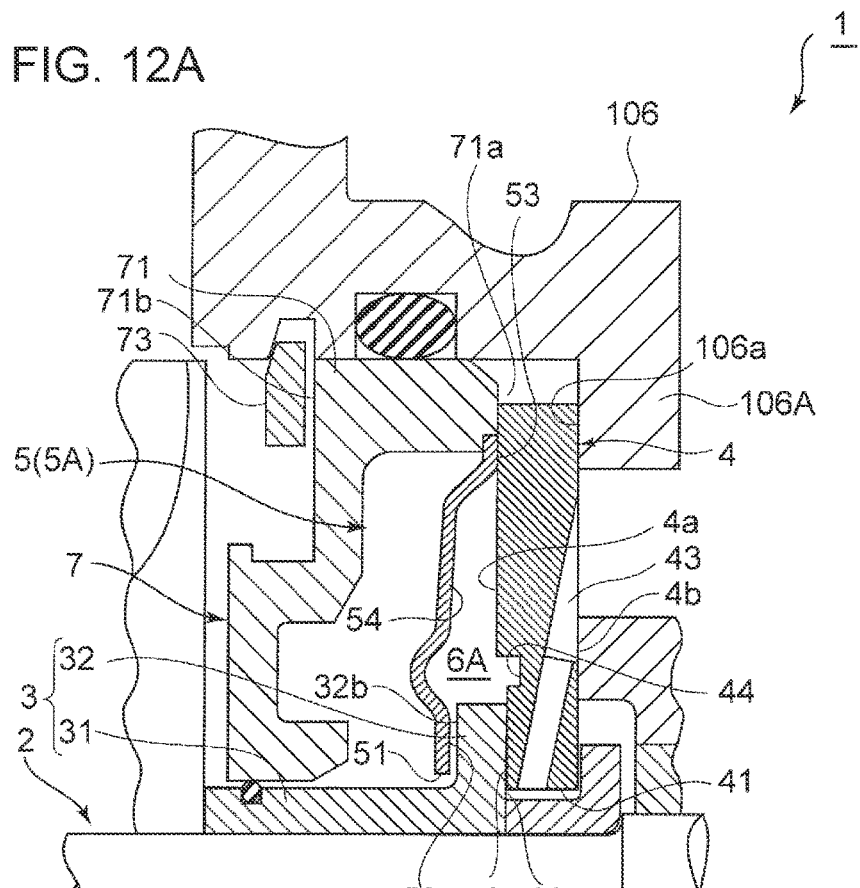
FIG. 12 is a partial enlarged view of section "a" in FIG. 1 and its peripheral structure, showing a cross-sectional view of an oil-drain device of a thrust bearing according to an embodiment of the present invention.
Figure 12B:
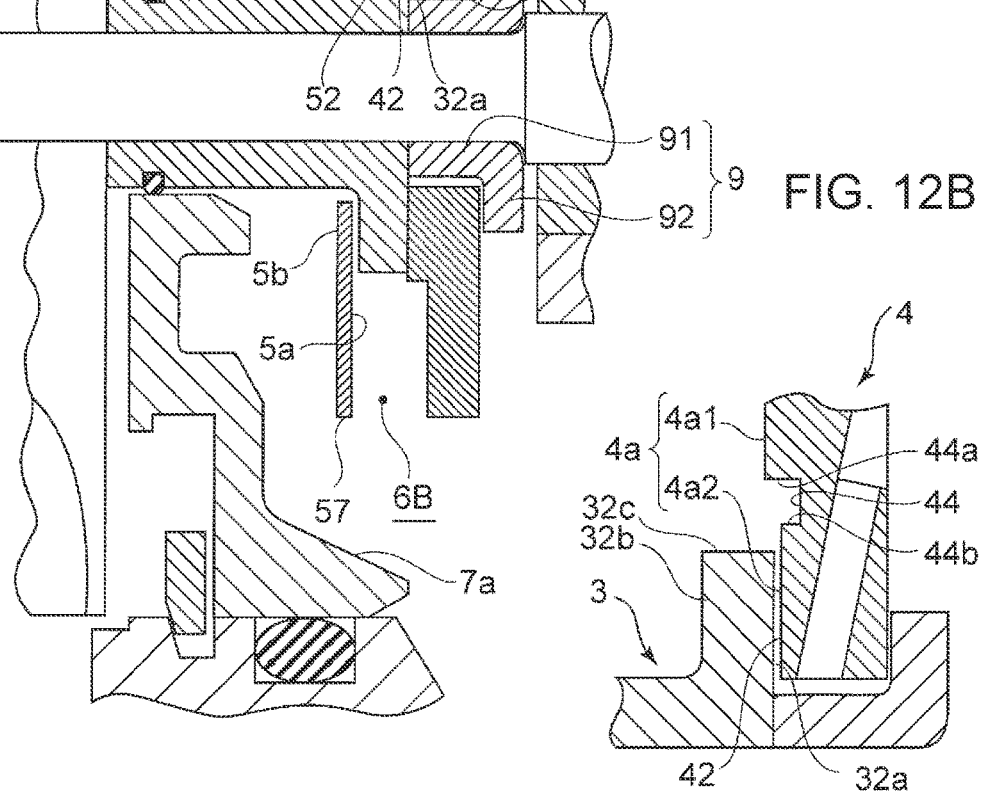
Figure 13:
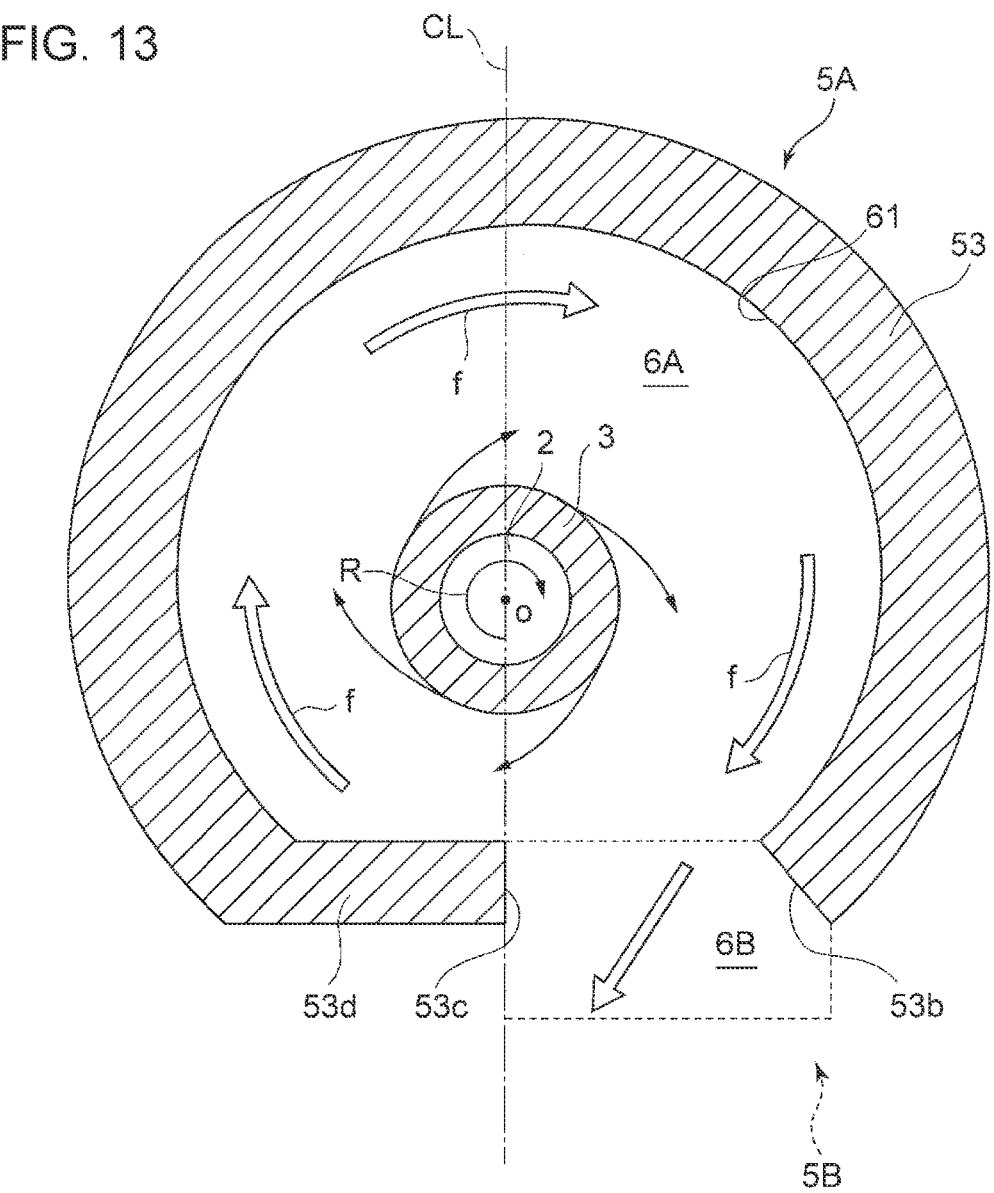
FIG. 13 is a schematic diagram of an oil-drain space inside an oil-drain device of a thrust bearing according to an embodiment of the present invention.
Figure 14:
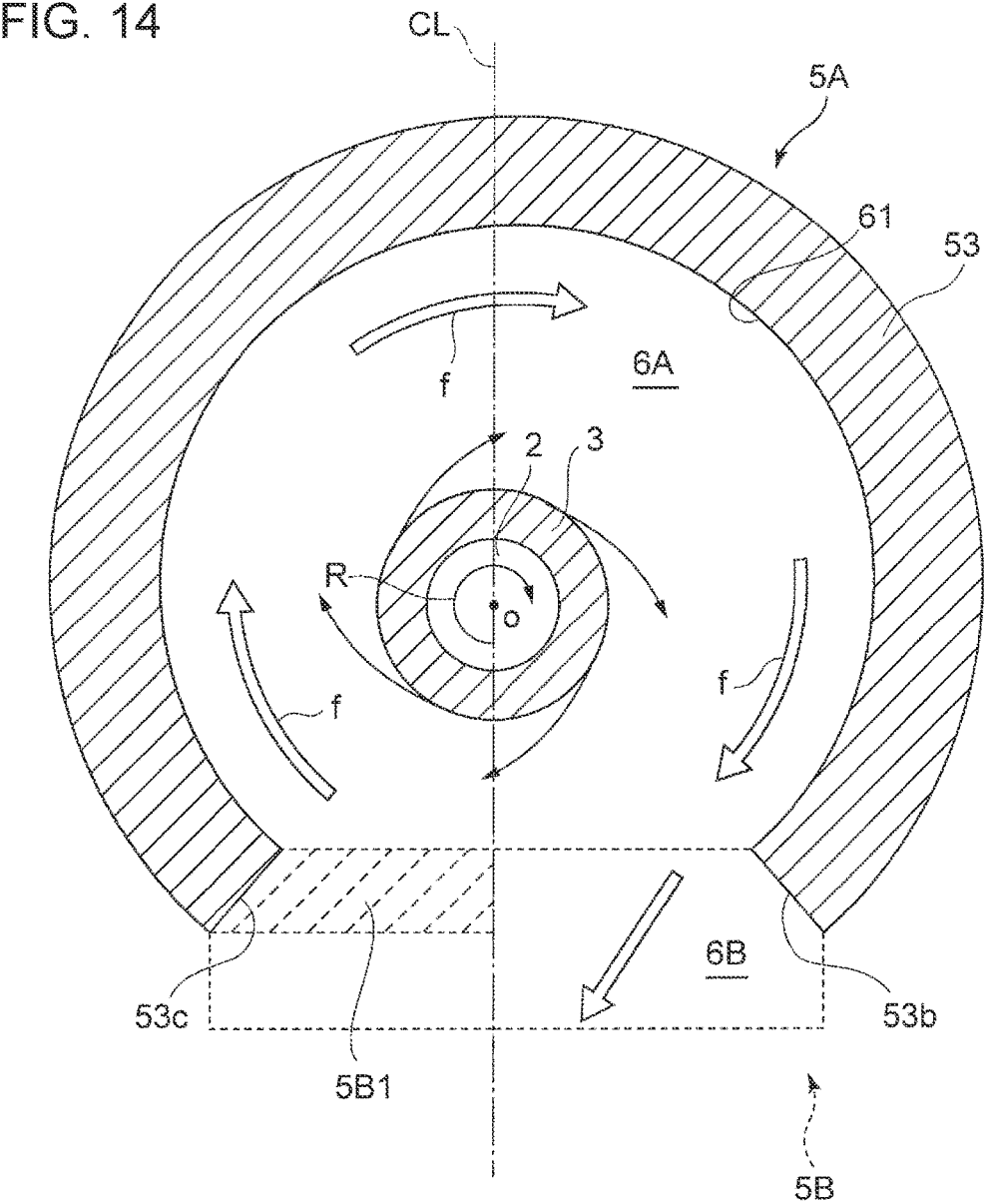
FIG. 14 is a schematic diagram of an oil-drain space inside an oil-drain device of a thrust bearing according to an embodiment of the present invention.
Figure 15A:
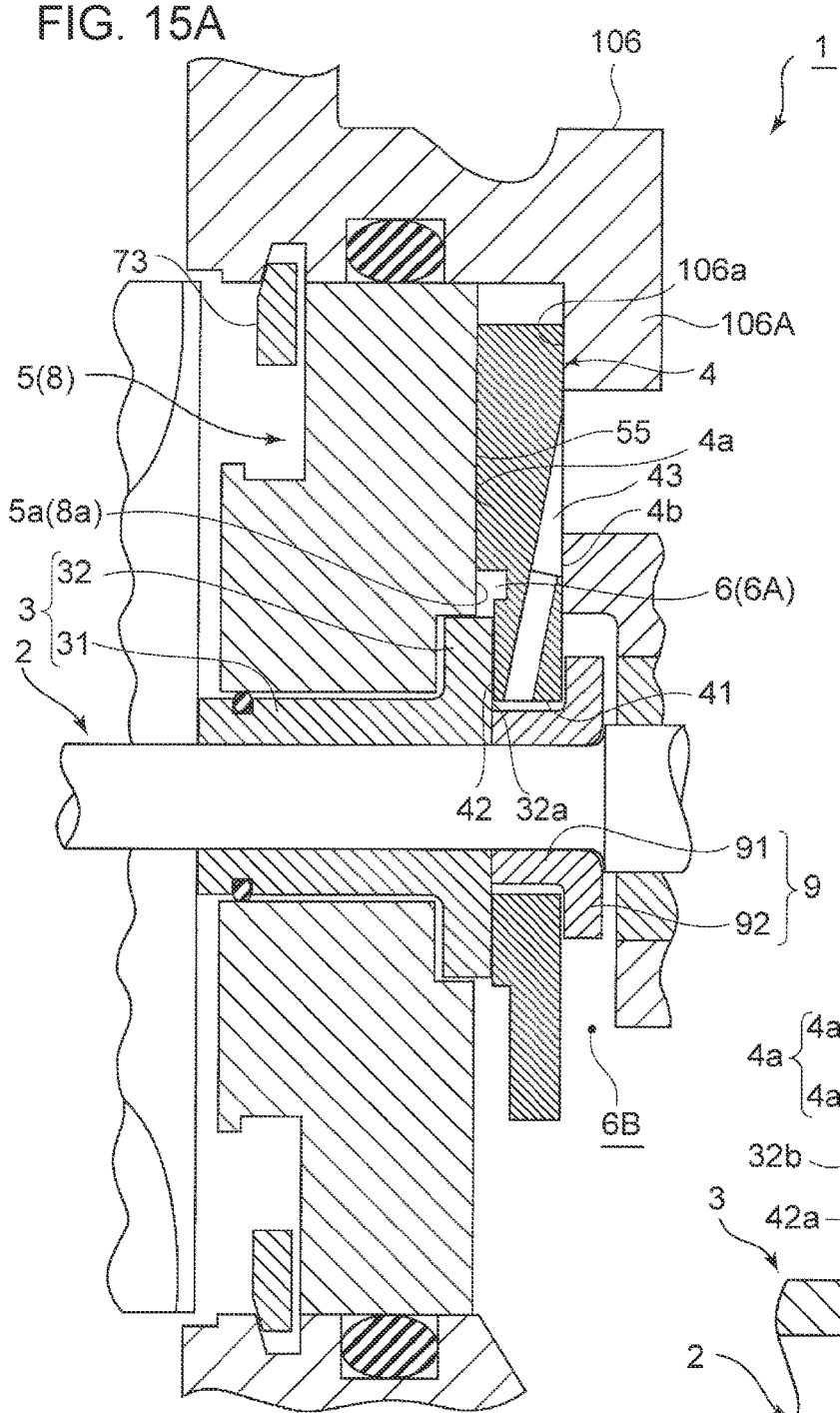
FIG. 15 is a partial enlarged view of section "a" in FIG. 1 and its peripheral structure, showing a cross-sectional view of an oil-drain device of a thrust bearing according to an embodiment of the present invention.
Figure 15B:
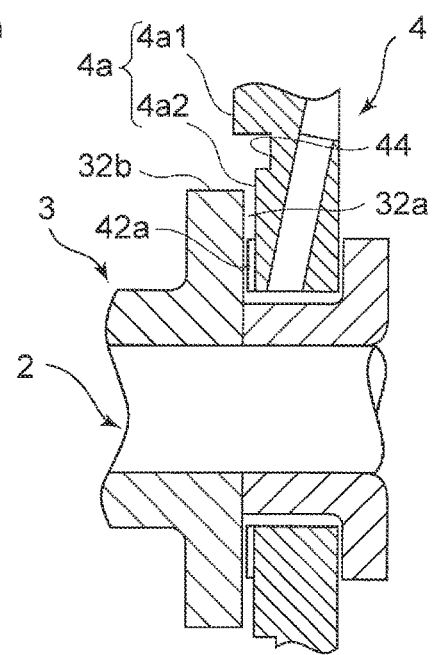

FIG. 2 is a partial enlarged view of section "a" in FIG. 1 and its peripheral structure, showing a cross-sectional view of an oil-drain device of a thrust bearing according to an embodiment of the present invention. FIG. 3 is an exploded perspective view of the oil-drain device of the thrust bearing depicted in FIG. 2. FIG. 4 is a schematic diagram of an oil-drain space inside the oil-drain device of the thrust bearing depicted in FIG. 2. FIG. 5 is a partial enlarged view of section "a" in FIG. 1 and its peripheral structure, showing a cross-sectional view of an oil-drain device of a thrust bearing according to an embodiment of the present invention. FIG. 6 is an exploded perspective view of the oil-drain device of the thrust bearing depicted in FIG. 5. FIG. 7 is a schematic diagram of an oil-drain space inside the oil-drain device of the thrust bearing depicted in FIG. 5. FIG. 8 is a cross-sectional view of the oil-drain device of the thrust bearing depicted in FIG. 5. FIG. 9 is a partial enlarged view of section "a" in FIG. 1 and its peripheral structure, showing a cross-sectional view of an oil-drain device of a thrust bearing according to an embodiment of the present invention. FIG. 10 is a perspective view of guide plates in the oil-drain device of the thrust bearing depicted in FIG. 9. FIG. 11 is a schematic diagram of an oil-drain space inside the oil-drain device of the thrust bearing according to an embodiment of the present invention. FIG. 12 is a partial enlarged view of section "a" in FIG. 1 and its peripheral structure, showing a cross-sectional view of an oil-drain device of a thrust bearing according to an embodiment of the present invention. FIG. 13 is a schematic diagram of an oil-drain space inside the oil-drain device of the thrust bearing according to an embodiment of the present invention. FIG. 14 is a schematic diagram of an oil-drain space inside the oil-drain device of the thrust bearing according to an embodiment of the present invention. FIG. 15 is a partial enlarged view of section "a" in FIG. 1 and its peripheral structure, showing a cross-sectional view of an oil-drain device of a thrust bearing according to an embodiment of the present invention.

The oil-drain device 1 of the thrust bearing according to at least one embodiment of the present invention includes a rotor shaft 2, a compressor-side thrust collar (collar member) 3, a thrust bearing 4, and an oil-drain space forming member 5, as depicted in FIGS. 2 to 15.

The compressor-side thrust collar 3 includes a collar body portion 31 of a cylindrical shape and a flange portion 32 formed to have a larger diameter than the collar body portion 31, as depicted in FIGS. 2, 5, 9, 12, and 15. The compressor-side thrust collar 3 is mounted to the outer periphery of the rotor shaft 2 so as to be rotatable with the rotor shaft 2.

In the depicted embodiment, a turbine-side thrust collar 9 is mounted to the outer periphery of the rotor shaft 2 closer to the turbine than the compressor-side thrust collar 3. The turbine-side thrust collar 9 includes a collar body portion 91 of a cylindrical shape and a flange portion 92 formed to have a larger diameter than the collar body portion 91. A tip surface of the collar body portion 91 of the turbine-side thrust collar 9 is in contact with a first end surface 32a of the flange portion 32 of the compressor-side thrust collar 3.

The thrust bearing 4 is an annular plate-shaped member having an insertion hole 41 into which the rotor shaft 2 is inserted, as depicted in FIGS. 2, 3, 5, 6, 9, 12, and 15. Further, when an axial directional force is applied to the rotor shaft 2 from the side of the compressor impeller 105 to the side of the turbine impeller 103, the thrust bearing 4 makes slide contact with the first end surface 32a of the flange portion 32 of the compressor-side thrust collar 3, thereby supporting the rotor shaft 2 in the axial direction in a state where the rotor shaft 2 rotates while being inserted into the insertion hole 41.

In the depicted embodiment, the collar body portion 91 of the above described turbine-side thrust collar 9 is disposed on the inner peripheral side of the thrust bearing 4. Specifically, the rotor shaft 2 and the collar body portion 91 of the turbine-side thrust collar 9 mounted to the outer periphery of the rotor shaft 2 are inserted into the insertion hole 41 of the thrust bearing 4. The outer peripheral edge portion of the thrust bearing 4 is fixed to the bearing housing 106 as described below. The inner peripheral surface of the thrust bearing 4 and the outer peripheral surface of the collar body portion 91 of the turbine-side thrust collar 9 make slide contact with each other accompanying rotation of the rotor shaft 2. Further, when an axial directional force is applied to the rotor shaft 2 from the turbine impeller 103 to the side of the compressor impeller 105, an inner peripheral portion of a second end surface 4b of the thrust bearing 4 makes slide contact with the flange portion 92 of the turbine-side thrust collar 9, whereby the thrust bearing 4 supports the rotor shaft 2 in the axial direction in a state where the rotor shaft 2 rotates while being inserted into the insertion hole 41.

Further, formed inside the thrust bearing 4 is an oil-supply channel 43 for supplying lubricant oil to the sliding portion 42 of the thrust bearing 4 that makes slide contact with the first end surface 32a of the flange portion 32 of the compressor-side thrust collar 3. The oil-supply channel 43 has an inlet-side opening formed on the second end surface 4b of the thrust bearing 4, and an outlet-side opening formed on the inner peripheral surface of the thrust bearing 4. Lubricant oil supplied from the outlet-side opening is supplied to clearance between the inner peripheral surface of the thrust bearing 4 and the outer peripheral surface of the collar body portion 91 of the turbine-side thrust collar 9, and to clearance between the sliding portion 42 of the thrust bearing 4 and the first end surface 32a of the flange portion 32 of the compressor-side thrust collar 3.

The oil-drain space forming member 5 is disposed on the side of the first end surface 4a of the thrust bearing 4, as depicted in FIGS. 2, 5, 9, 12, and 15. Further, the oil-drain space forming member 5 defines the oil-drain space 6 between the oil-drain space forming member 5 and the thrust bearing 4, through which lubricant oil leaking from the sliding portion 42 of the thrust bearing 4 flows.

The oil-drain space 6 includes an oil-drain channel 6A and an oil-drain port 6B, as depicted in FIGS. 4, 7, 11, 13, and 14. The oil-drain channel 6A is defined between the first end surface 4a of the thrust bearing 4 and a first end surface 5a of the oil-drain space forming member 5, and is formed to surround the flange portion 32 of the compressor-side thrust collar 3. The oil-drain port 6B is formed on a lower part of the oil-drain channel 6A, and drains lubricant oil flowing through the oil-drain channel 6A outside the oil-drain space 6. Lubricant oil discharged from the oil-drain space 6 is discharged through the oil-outlet channel 114 formed on the lower part of the bearing housing 106 depicted in FIG. 1 to outside the bearing housing 106. As depicted in FIGS. 4 and 6, the oil-drain space 6 is configured so as to guide lubricant oil flowing through the oil-drain channel 6A outside the oil-drain space 6 via the oil-drain port 6B, along a flow direction f of lubricant oil flowing through the oil-drain channel 6A from the upstream side toward the downstream side of the rotational direction R of the rotor shaft 2.

With the oil-drain device 1 for a thrust bearing according to at least one embodiment of the present invention, lubricant oil supplied to the thrust bearing 4 is smoothly discharged from the oil-drain space 6, and thus lubricant oil does not accumulate inside the oil-drain space 6. Thus, it is possible to reduce the risk of occurrence of stirring loss due to contact between the compressor-side thrust collar 3 (collar member) and the gas-liquid boundary surface of lubricant oil.

In some embodiments, as depicted in FIGS. 2 to 4, the oil-drain space forming member 5 includes a body portion 5A of an annular shape having a center hole 51, an inner peripheral edge portion 52, an intermediate portion 54, and an outer peripheral edge portion 53, but does not include a tongue portion 5B, unlike the embodiments described below. The collar body portion 31 of the compressor-side thrust collar 3 mounted to the rotor shaft 2 is inserted into the center hole 51. The inner peripheral edge portion 52 makes slide contact with the second end surface 32b of the flange portion 32 of the compressor-side thrust collar 3 at the outer side of the center hole 51 in the radial direction. The intermediate portion 54 is formed at a gap from the first end surface 4a of the thrust bearing 4, at the outer side of the inner peripheral edge portion 52 in the radial direction. The outer peripheral edge portion 53 makes contact with the first end surface 4a of the thrust bearing 4, at the outer side of the inner peripheral edge portion 54 in the radial direction. The oil-drain port 6B is formed by a portion at a lower end 57 of the body portion 5A, where the outer peripheral edge portion 53 is not formed. The outer peripheral edge portion 53 has a linear portion 53a formed along the tangent direction at a predetermined position "a" (see FIG. 4) that is upstream of the oil-drain port 6B in the rotational direction R, the linear portion 53 extending from the predetermined position "a" to the oil-drain port 6B. The linear guide portion 53a guides lubricant oil flowing through the oil-drain channel 6A outside the oil-drain space 6 via the oil-drain port 6B along the flow direction f of lubricant oil.

Further, in the depicted embodiment, the thrust bearing 4 has a simple planar shape, which is a circle with its lower portion linearly cut off. In contrast, the thrust bearing 4 of the embodiment depicted in FIG. 6 described below has a cut-out portion 44 of a recess shape so as to define an oil-drain port 6B between the thrust bearing 4 and the tongue portion 5B.

Lubricant oil that flows through the oil-drain channel 6A flows mainly along the outer peripheral edge 61 of the oil-drain channel 6A, due to a centrifugal force generated in association with rotation of the rotor shaft 2. Thus, according to this embodiment, the outer peripheral edge portion 53 forming an outer peripheral edge 61 of the oil-drain channel 6A has the linear portion 53a formed along the tangent direction at a predetermined position "a" that is upstream of the oil-drain port 6B in the rotational direction R, the linear portion 53 extending from the predetermined position "a" to the oil-drain port 6B, whereby it is possible to guide lubricant oil that flows through the oil-drain channel 6A to the oil-drain port 6B along the linear portion 53a smoothly.

In some embodiments, as depicted in FIG. 2, the oil-drain device 1 further includes a retainer 7 disposed on the side of the second end surface 5b of the oil-drain space forming member 5 and configured to retain the oil-drain space forming member 5 and the thrust bearing 4 on the outer side of the rotor shaft 2 in the radial direction. The retainer 7 includes an inclined surface 7a extending obliquely downward toward the thrust bearing 4 below the oil-drain port 6B.

In the depicted embodiment, the oil-drain space forming member 5 includes an oil deflector 5, which is an annular member made from sheet metal. Further, the retainer 7 is also an annular member, including a protruding portion 71 formed on the outer peripheral portion of the retainer 7, so as to protrude toward the thrust bearing 4. A tip surface 71a is formed on a portion of the protruding portion 71 where the above described inclined surface 7a is not formed and which makes contact with the thrust bearing 4 and the oil-drain space forming member 5. The tip surface 71a pushes the outer peripheral edge portion 53 of the oil deflector 5 and the outer peripheral edge portion of the thrust bearing 4 against a first end surface 106a of an inner peripheral protruding portion 106A of the bearing housing 106, and thereby retains the thrust bearing 4 and the oil-drain space forming member 5 on the outer side of the rotor shaft 2 in the radial direction. Further, a rear end surface 71b of the protruding portion 71 is in contact with a movement-restriction member 73 having an annular shape engaged with an inner peripheral groove of the bearing housing 106. The movement-restriction member 73 pushes the retainer 7 toward the thrust bearing 4.

With the above embodiment, lubricant oil discharged from the oil-drain port 6B downward flows along the inclined surface 7a of the retainer 7 to be guided outside the bearing housing 106. Thus, it is unnecessary to form the tongue portion 5B or the like on the oil-drain space forming member 5, to guide lubricant oil discharged from the oil-drain port 6B outside the bearing housing 106, and thereby it is possible to simplify the shape of the oil-drain space forming member 5 and the thrust bearing 4.

In some embodiments, as depicted in FIGS. 5 to 8, the oil-drain space forming member 5 includes: a body portion 5A of an annular shape having a center hole 51, an inner peripheral edge portion 52, an intermediate portion 54, and an outer peripheral edge portion 53; and a tongue portion 5B of a plate shape which extends obliquely downward from the lower end 57 of the body portion 5A toward the thrust bearing 4. The collar body portion 31 of the compressor-side thrust collar 3 mounted to the rotor shaft 2 is inserted into the center hole 51. The inner peripheral edge portion 52 makes slide contact with the second end surface 32b of the flange portion 32 of the compressor-side thrust collar 3 at the outer side of the center hole 51 in the radial direction. The intermediate portion 54 is formed at a gap from the first end surface 4a of the thrust bearing 4, at the outer side of the inner peripheral edge portion 52 in the radial direction. The outer peripheral edge portion 53 makes contact with the first end surface 4a of the thrust bearing 4, at the outer side of the inner peripheral edge portion 54 in the radial direction. The oil-drain port 6B is formed by a portion at a lower end 57 of the body portion 5A, where the outer peripheral edge portion 53 is not formed. The tongue portion 5B is formed to incline downward from the side of the downstream edge 53b toward the side of the upstream edge 53c of the outer peripheral edge portion 53, in a front view of the oil-drain space 6 as seen in the axial direction. Specifically, as depicted in FIG. 8, the height H of the oil-drain port 6B, which is defined as a vertical distance between the thrust bearing 4 and the tongue portion 5B, is formed so as to increase from the side of the downstream edge 53b toward the side of the upstream edge 53c gradually (H3<H2<H1). The tongue portion 5B guides lubricant oil flowing through the oil-drain channel 6A outside the oil-drain space 6 via the oil-drain port 6B along the flow direction f of the lubricant oil.

Further, in the depicted embodiment, the cut-out portion 44 of a recessed shape is formed on a lower part of the thrust bearing 4. Further, the oil-drain port 6B is defined between the cut-out portion 44 and the tongue portion 5B disposed below the cut-out portion 44.

In this embodiment, the oil-drain space forming member 5 includes the body portion 5A defining the oil-drain space 6 between the body portion 5A and the thrust bearing 4, and the tongue portion 5B extending obliquely downward from a lower end of the body portion 5A toward the thrust bearing 4. The tongue portion 5B guides lubricant oil discharged from the oil-drain port 5B to the oil-outlet channel 114 of the bearing housing 106. However, if the oil-drain space forming member 5 includes the tongue portion 5B, there is a risk of lubricant oil discharged from the oil-drain channel 6A flowing along the surface of the tongue portion 5B to return to the oil-drain channel 6A without being discharged from the oil-drain port 6B, due to the action of a centrifugal force of the rotor shaft 2.

Thus, according to this embodiment, the tongue portion 5B is formed to incline downward from the side of the downstream edge 53b toward the side of the upstream edge 53c of the outer peripheral edge portion 53 in the front view, and thereby it is possible to reduce the amount of lubricant oil that returns to the oil-drain channel 6A without being discharged from the oil-drain port 6B.

Figure 9B:
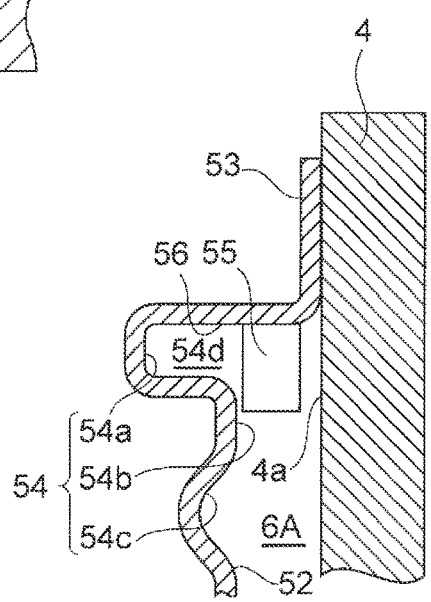
Figure 10:
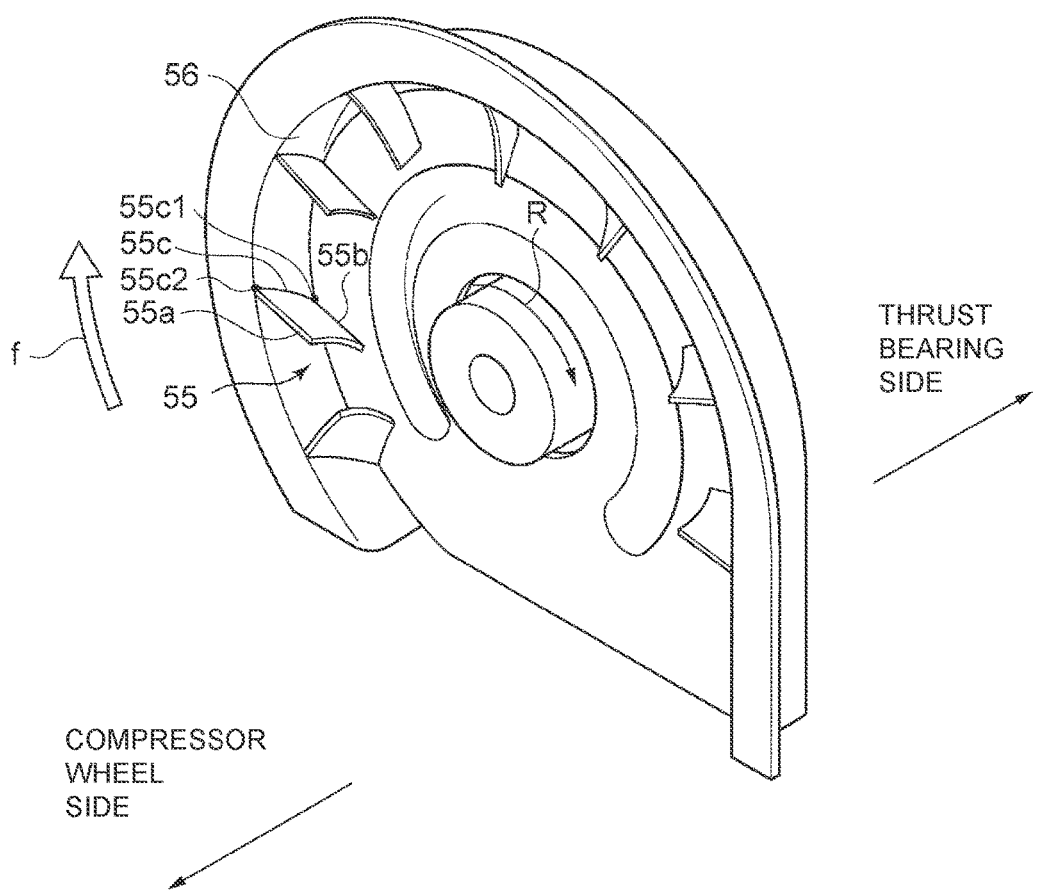
FIG. 10 is a perspective view of guide plates in the oil-drain device for a thrust bearing depicted in FIG. 9.

In some embodiments, as depicted in FIGS. 9 and 10, the intermediate portion 54 of the oil-drain space forming member 5 includes a recessed portion 54a disposed at a greater gap from the first end surface 4a of the thrust bearing 4, than the other portion of the intermediate portion 54. The oil-drain channel 6A includes an oil-drain groove 54d (see FIG. 9B) formed by the above described recessed portion 54a to extend in the circumferential direction.

In the depicted embodiment, the recessed portion 54a is formed to connect to a peripheral edge portion 56 that extends perpendicular to the first end surface 4a of the thrust bearing 4, at a position radially inside the outer peripheral edge portion 53. Further, besides the recessed portion 54a, the intermediate portion 54 includes a flat portion 54b disposed radially inside the recessed portion 54a, and a concave portion 54c disposed radially inside the flat portion 54b. Among the recessed portion 54a, the flat portion 54b, and the concave portion 54c, the recessed portion 54a has the greatest gap from the first end surface 4a of the thrust bearing 4.

Accordingly, with the oil-drain groove 54d disposed on the outermost side in the radial direction of the intermediate portion 54, lubricant oil flowing along the outer peripheral edge 61 of the oil-drain channel 6A can be readily guided to the oil-drain groove 54d with the action of the centrifugal force of the rotor shaft 2.

With this embodiment, the above described oil-drain channel 6A includes the oil-drain groove 54d extending in the circumferential direction formed by the recessed portion 54a. Lubricant oil flowing through the oil-drain groove 54d flows through the oil-drain channel 6A without making contact with the flange portion 32 of the compressor-side thrust collar 3, and is discharged outside the oil-drain space 6 through the oil-drain port 6B. Thus, according to the present embodiment, as compared to a case where the oil-drain groove 54d is not formed, it is possible to form the gas-liquid boundary surface of lubricant oil that flows through the oil-drain channel 6A on the further outer side in the radial direction. Thus, it is possible to reduce the risk of occurrence of stirring loss between the lubricant oil and the compressor-side thrust collar 3 that rotates with the rotor shaft 2.

In some embodiments, as depicted in FIGS. 9 and 10, the oil-drain space forming member 5 further includes guide plates 55, disposed at intervals in the circumferential direction in the oil-drain channel 6A, for guiding lubricant oil that flows through the oil-drain channel 6A to the oil-drain groove 54d.

According to this embodiment, the guide plates 55 guide lubricant oil flowing through the oil-drain channel 6A to the oil-drain groove 54d. Accordingly, the amount of lubricant oil that flows through the oil-drain groove 54d increases even further, and thereby it is possible to reduce the risk of occurrence of stirring loss between the lubricant oil and the compressor-side thrust collar 3 that rotates with the rotor shaft 2.

In some embodiments, as depicted in FIG. 10, the guide plates 55 extend inward in the radial direction from a peripheral edge portion 56 of the oil-drain space forming member 5. A Leading edge 55a of each guide plate 55 is positioned closer to the thrust bearing 4 than a trailing edge 55b of the guide plate 55, and thus the intersection 55c1 between the leading edge 55a and the peripheral edge portion 56 is disposed upstream of the intersection 55c2 between the trailing edge 55b and the peripheral edge portion 56 with respect to the flow direction f.

According to this embodiment, it is possible to guide lubricant oil flowing through the oil-drain channel 6A smoothly to the oil-drain groove 54d along the flow direction f of the oil-drain channel 6A. Accordingly, the amount of lubricant oil that flows through the oil-drain groove 54d increases even further, and thereby it is possible to reduce the risk of occurrence of stirring loss between the lubricant oil and the compressor-side thrust collar 3 that rotates with the rotor shaft 2.

In some embodiments, as depicted in FIG. 11, the oil-drain space forming member 5 has a second oil-drain port 6C communicating with the oil-drain channel 6A. That is, the outer peripheral edge portion 53 is not formed at a section where the second oil-drain port 6C is formed. Lubricant oil flowing through the oil-drain channel 6A is discharged outside the oil-drain space 6 via the second oil-drain port 6C.

According to this embodiment, lubricant oil flowing through the oil-drain channel 6A is discharged also through the second oil-drain channel 6C. Accordingly, it is possible to reduce the amount of lubricant oil that flows through the oil-drain channel 6A, and thereby it is possible to prevent accumulation of lubricant oil inside the oil-drain space 6 and to reduce the risk of occurrence of stirring loss between the lubricant oil and the compressor-side thrust collar 3 that rotates with the rotor shaft 2.

In some embodiments, as depicted in FIG. 11, the second oil-drain port 6C is formed so as to have an opening that faces the flow direction f of lubricant oil that flows through the oil-drain channel 6A, at an upper part of the oil-drain space forming member 5.

In the depicted embodiment, the second oil-drain port 6C has an upper side portion 53e that extends from point "b", which is the uppermost portion of the oil-drain channel 6A, along the tangent direction at the point "b".

According to this embodiment, lubricant oil flowing through the oil-drain channel 6A is likely to meet at the second oil-drain port 6C, and thus the amount of lubricant oil discharged from the second oil-drain port 6C increases. Accordingly, it is possible to reduce the amount of lubricant oil that flows through the oil-drain channel 6A even further. Thus, it is possible to prevent accumulation of lubricant oil inside the oil-drain space 6 and to reduce the risk of occurrence of stirring loss between the lubricant oil and the compressor-side thrust collar 3 that rotates with the rotor shaft 2.

In some embodiments, as depicted in FIG. 12, a groove portion 44 extending in the circumferential direction is formed on the first end surface 4a of the thrust bearing 4, at a position radially outside an outer peripheral edge surface 32c of the flange portion 32. An outer first-end surface 4a1, which is a part of the first end surface 4a of the thrust bearing 4 disposed outside the groove portion 44 in the radial direction, protrudes to be closer to the oil-drain space forming member 5 than an inner first end surface 4a2 that is disposed radially inside the groove portion 44. The sliding portion 42 of the thrust bearing 4 is a portion of the inner first end surface 4a2 that makes slide contact with the first end surface 32a of the flange portion 32.

According to this embodiment, lubricant oil that leaks radially outward from the sliding portion 42 of the thrust bearing 4 is guided to the groove portion 44 formed on the first end surface 4a of the thrust bearing 4. Lubricant oil flowing through the groove portion 44 flows through the oil-drain channel 6A without making contact with the compressor-side thrust collar 3, and is discharged outside through the oil-drain port 6B. Thus, according to the present embodiment, as compared to a case where the groove portion 44 is not formed on the first end surface 4a of the thrust bearing 4, it is possible to form the gas-liquid boundary surface of lubricant oil that flows through the oil-drain channel 6A on the further outer side in the radial direction. Thus, it is possible to reduce the risk of occurrence of stirring loss between the lubricant oil and the compressor-side thrust collar 3.

In some embodiments, as depicted in FIG. 13, the oil-drain port 6B is formed in an upstream region, in the rotational direction R, of the center line CL extending in the upward and downward direction through the rotational center O of the rotor shaft 2.

Herein, "the upward and downward direction" is the upward and downward direction (vertical direction) of the bearing housing 106 disposed so that the oil-outlet channel 114 is at the lower side when the oil-drain device 1 for a thrust bearing of the present embodiment is mounted inside the bearing housing 106.

As described above, if the oil-drain space forming member 5 includes the tongue portion 5B, there is a risk of lubricant oil discharged from the oil-drain channel 6A flowing along the surface of the tongue portion 5B to return to the oil-drain channel 6A without being discharged from the oil-drain port 6B, due to the action of a centrifugal force of the rotor shaft 2.

Thus, according to this embodiment, the oil-drain port 6B is formed only in an upstream region of the center line CL in the rotational direction R, and thereby it is possible to reduce the amount of lubricant oil that returns to the oil-drain channel 6A without being discharged from the oil-drain port 6B.

In some embodiments, the oil-drain space forming member 5 includes: a body portion 5A of an annular shape having a center hole 51, an inner peripheral edge portion 52, an intermediate portion 54, and an outer peripheral edge portion 53; and a tongue portion 5B of a plate shape which extends obliquely downward from the lower end 57 of the body portion 5A toward the thrust bearing 4. The oil-drain port 6B is formed by a portion at a lower end 57 of the body portion 5A, where the outer peripheral edge portion 53 is not formed. Further, as depicted in FIG. 14, the oil-drain port 6B is formed in an upstream region, in the rotational direction R, of the center line CL extending in the upward and downward direction through the rotational center O of the rotor shaft 2, or the tongue portion 5B has a bend portion 5B1 that is bended to close the oil-drain port 6B in a downstream region of the center line CL in the rotational direction R.

According to this embodiment, the tongue portion 5B has the bend portion 5B1 that is bended to close the oil-drain port 6B in a downstream region of the center line CL in the rotational direction R. Thus, it is possible to reduce the amount of lubricant oil that returns to the oil-drain channel 6A without being discharged from the oil-drain port 6B.

In some embodiments, as depicted in FIGS. 4, 7, and 11, the oil-drain channel 6A is formed to have a flow-path cross sectional area that increases in the rotational direction R, from the upstream edge 53c toward the downstream edge 53b of the outer peripheral edge portion 53.

In the depicted embodiment, the oil-drain channel 6A is formed to have a flow-path width that increases from the upstream side toward the downstream side in the following order: a<b<c.

Lubricant oil that flows through the oil-drain channel 6A increases in the flow rate toward the downstream side in the rotational direction R. Thus, if the flow-path cross sectional area is small for the amount of lubricant oil, it forms a gas-liquid boundary surface of lubricant oil on the inner side in the radial direction, raising a risk of contact between the lubricant oil and the compressor-side thrust collar 3.

In this regard, according to this embodiment, the flow-path cross sectional area increases at the downstream side of the oil-drain channel 6A where the amount of lubricant oil increases, and thereby it is possible to prevent contact between a gas-liquid boundary surface of lubricant oil and the compressor-side thrust collar 3 at the downstream side of the oil-drain channel 6A.

The embodiments of the present invention have been described above. However, the present invention is not limited thereto. For instance, various modifications may be applied as long as they do not depart from the object of the present invention.

For instance, in the embodiment depicted in FIG. 12, the oil-drain space forming member 5 is formed by an oil deflector 5 made from sheet metal. Further, the oil deflector 5 and the thrust bearing 4 are fixed to the bearing housing 106 with the retainer 7.

However, as depicted in FIG. 15, the oil-drain space forming member 5 may be formed by an insert member 8, without providing the oil deflector 5 and the retainer 7. The insert member 8 is an annular single-piece member produced by casting or forging. The movement-restriction member 73 pushes the insert member 8 toward the thrust bearing 4, and thereby the thrust bearing 4 is fixed to the bearing housing 106.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with the first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space forming member 5 may comprise an insert member 8 configured to retain the thrust bearing 4 on a radially outer side of the rotor shaft 2. The oil-drain space 6 may include: an oil-drain channel 6A defined between the groove portion 44 formed radially outside the outer peripheral edge surface 32c of the flange portion 32 on the first end surface 4a of the thrust bearing 4 and the first end surface 8a of the insert member 8, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. An outer first-end surface 4a1, which is a part of the first end surface 4a of the thrust bearing 4 disposed radially outside the groove portion 44, protrudes to be closer to the insert member 8 than an inner first end surface 4a2 disposed radially inside the groove portion 44.

With the above oil-drain device 1 for a thrust bearing, lubricant oil that leaks radially outward from the sliding portion 42 of the thrust bearing 4 is guided to the groove portion 44 formed on the first end surface 4a of the thrust bearing 4. Lubricant oil flowing through the oil-drain groove 44 is discharged outside through the oil-drain port 6B without making contact with the collar member 3. Thus, according to the present embodiment, as compared to a case where the groove portion 44 is not formed, it is possible to form the gas-liquid boundary surface of lubricant oil that flows through the oil-drain channel 6A on the further outer side in the radial direction, which reduces the risk of occurrence of stirring loss between the lubricant oil and the compressor-side thrust collar 3.

Further, in the present embodiment, the oil-drain space forming member 5 includes the insert member 8 configured to retain the thrust bearing 4 on the outer side of the rotor shaft 2 in the radial direction. Specifically, in the present embodiment, the oil deflector 5 and the retainer 7 may be omitted. Thus, it is possible to reduce the number of components as compared to the oil-drain device 1 for a thrust bearing having the oil deflector 5 and the retainer 7.

Further, the oil-drain device 1 for a thrust bearing according to the embodiment depicted in FIGS. 9 and 10 may not necessarily include all of the features of the embodiment depicted in FIGS. 2 to 4, or of the embodiment depicted in FIGS. 5 to 8.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with the first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space 6 may include: an oil-drain channel 6A defined between the first end surface 4a of the thrust bearing 4 and the first end surface 5a of the oil-drain space forming member 5, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. The oil-drain space forming member 5 at least comprises a body portion 5A having: a center hole 51 into which the collar body portion 31 of the collar member 3 mounted to the rotor shaft 2 is inserted; an inner peripheral edge portion 52 which makes slide contact with a second end surface 32b of the flange portion 32 of the collar member 3 at a radially outer side of the center hole 51; an intermediate portion 54 formed on a radially outer side of the inner peripheral edge portion 52, with a gap from the first end surface 4a of the thrust bearing 4; and an outer peripheral edge portion 53 configured to make contact with the first end surface 4a of the thrust bearing 4 at a radially outer side of the intermediate portion 54. The oil-drain port 6B is formed by a portion at a lower end 57 of the body portion 5A, the portion not having the outer peripheral edge portion 53 formed thereon. The intermediate portion 54 of the oil-drain space forming member 5 may include a recessed portion 54a configured such that a gap from the first end surface 4a of the thrust bearing 4 is greater at the recessed portion 43a than at other part of the intermediate portion 54. The oil-drain channel 6A may include an oil-drain groove 54d extending in a circumferential direction formed by the recessed portion 54a.

Further, the oil-drain device 1 for a thrust bearing according to the embodiment depicted in FIG. 11 may not necessarily include all of the features of the embodiment depicted in FIGS. 2 to 4, or of the embodiment depicted in FIGS. 5 to 8.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with the first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space 6 may include: an oil-drain channel 6A defined between the first end surface 4a of the thrust bearing 4 and the first end surface 5a of the oil-drain space forming member 5, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. The oil-drain space forming member 5 may have a second oil-drain port 6C communicating with the oil-drain channel 6A and is configured such that the lubricant oil flowing through the oil-drain channel 6A is discharged outside the oil-drain space 6 via the second oil-drain port 6C.

Further, the oil-drain device 1 for a thrust bearing according to the embodiment depicted in FIG. 12 may not necessarily include all of the features of the embodiment depicted in FIGS. 2 to 4, or of the embodiment depicted in FIGS. 5 to 8.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with the first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space 6 may include: an oil-drain channel 6A defined between the first end surface 4a of the thrust bearing 4 and the first end surface 5a of the oil-drain space forming member 5, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. A groove portion 44 extending in a circumferential direction may be formed on the first end surface 4a of the thrust bearing 4 at a position radially outside an outer peripheral edge surface 32c of the flange portion 32. The first end surface 4a of the thrust bearing 4 may comprise an outer first end surface 4a1 disposed on a radially outer side of the groove portion 44 and an inner first end surface 4a2 disposed on a radially inner side of the groove portion 44, the outer first end surface 4a1 protruding toward the oil-drain space forming member 5 to be closer to the oil-drain space forming member 5 than the inner first end surface 4a2.

Further, the oil-drain device 1 for a thrust bearing according to the embodiment depicted in FIG. 13 may not necessarily include all of the features of the embodiment depicted in FIGS. 2 to 4, or of the embodiment depicted in FIGS. 5 to 8.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with the first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space 6 may include: an oil-drain channel 6A defined between the first end surface 4a of the thrust bearing 4 and the first end surface 5a of the oil-drain space forming member 5, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. The oil-drain port 6B may be formed in an upstream region, in the rotational direction R, of a center line CL extending in an upward and downward direction through a rotational center O of the rotor shaft.

Further, the oil-drain device 1 for a thrust bearing according to the embodiment depicted in FIG. 14 may not necessarily include all of the features of the embodiment depicted in FIGS. 2 to 4, or of the embodiment depicted in FIGS. 5 to 8.

In other words, the oil-drain device 1 for a thrust bearing according to at least one embodiment of the present invention may comprise: a rotor shaft 2; a collar member 3 (compressor-side thrust collar 3) to be mounted to an outer periphery of the rotor shaft 2 so as to be rotatable with the rotor shaft 2, the collar member 3 having a collar body portion 31 having a cylindrical shape and a flange portion 32 formed to have a larger diameter than the collar body portion 31; a thrust bearing 4 having an insertion hole 41 into which the rotor shaft 2 is inserted, the thrust bearing 4 being configured to make slide contact with a first end surface 32a of the flange portion 32 of the collar member 3 to support the rotor shaft 2 which rotates in a state of being inserted into the insertion hole 41 in an axial direction; an oil-supply channel 43 for supplying lubricant oil to a sliding portion 42 of the thrust bearing 4 which makes slide contact with the first end surface 32a of the flange portion 32; and an oil-drain space forming member 5 disposed on a side of a first end surface 4a of the thrust bearing 4, the oil-drain space forming member 5 defining an oil-drain space 6 through which the lubricant oil leaking from the sliding portion 42 of the thrust bearing 4 flows, between the thrust bearing 4 and the oil-drain space forming member 5. The oil-drain space 6 may include: an oil-drain channel 6A defined between the first end surface 4a of the thrust bearing 4 and the first end surface 5a of the oil-drain space forming member 5, the oil-drain channel 6A surrounding the flange portion 32 of the collar member 3; and an oil-drain port 6B formed below the oil-drain channel 6A, for discharging the lubricant oil flowing through the oil-drain channel 6A outside the oil-drain space 6. The oil-drain space forming member 5 may comprise: a body portion 5A including a center hole 51 into which the collar body portion 31 of the collar member 3 mounted to the rotor shaft 2 is inserted, an inner peripheral edge portion 52 which makes slide contact with a second end surface 32b of the flange portion 32 of the collar member 3 at a radially outer side of the center hole 51, an intermediate portion 54 formed on a radially outer side of the inner peripheral edge portion 52, with a gap from the first end surface 4a of the thrust bearing 4, and an outer peripheral edge portion 53 configured to make contact with the first end surface 4a of the thrust bearing 4 at a radially outer side of the intermediate portion 54; and a tongue portion 5B extending obliquely downward from a lower end 57 of the body portion 5A toward the thrust bearing 4. The oil-drain port 6B may be formed by a portion at the lower end 57 of the body portion 5A, the portion not having the outer peripheral edge portion 53 formed thereon. The tongue portion 5B may include a bend portion 5B1 bended to close the oil-drain port 6B in a downstream region, in the rotational direction R, of the center line CL.

DESCRIPTION OF REFERENCE NUMERALS

1 Thrust bearing device
2 Rotor shaft
3 Compressor-side thrust collar (collar member)
31 Collar body portion
32 Flange portion
4 Thrust bearing
4a First end surface
4b Second end surface
41 Insertion hole
42 Sliding portion
43 Oil-supply channel
44 Cut-out portion
44 Groove portion
5 Oil deflector (oil-drain space forming member)
5a First end surface
5b Second end surface
5A body portion
5B Tongue portion
51 Center hole
52 Peripheral edge portion
52 Inner peripheral edge portion
53 Outer peripheral edge portion
53a Linear portion
53b Downstream edge
53c Upstream edge
54 Intermediate portion
54a Recessed portion
54b Flat portion
53c Concave portion
54d Oil-drain groove
55 Guide plate
55a Leading edge
55b Trailing edge
56 Peripheral edge portion
57 Lower edge
6 Oil-drain space
6A Oil-drain channel
6B Oil-drain port
6C Second oil-drain port
61 Outer peripheral edge
7 Retainer
7a Inclined surface
71 Protruding portion
71a Tip surface
71b Rear end surface
73 Movement-restriction member
8 Insert member
9 Turbine-side thrust collar
91 Collar body portion
92 Flange portion
100 Turbocharger
102 Turbine housing
103 Turbine impeller 103a Turbine hub
103b Turbine blade
104 Compressor housing
105 Compressor impeller
105a Compressor hub
105b Compressor blade
106 Bearing housing
106A Inner peripheral protruding portion
110 Radial bearing
111 Exhaust-gas outlet
112 Oil-inlet channel
113 Turbine scroll passage
114 Oil-outlet channel
115 Intake inlet
116 Nut
117 Compressor scroll passage

The invention claimed is:

1. An oil-drain device for a thrust bearing, comprising:
a rotor shaft;
a collar member to be mounted to an outer periphery of the rotor shaft so as to be rotatable with the rotor shaft, the collar member having a collar body portion having a cylindrical shape and a flange portion formed to have a larger diameter than the collar body portion;
a thrust bearing having an insertion hole into which the rotor shaft is inserted, the thrust bearing being configured to make slide contact with a first end surface of the flange portion of the collar member to support the rotor shaft which rotates in a state of being inserted into the insertion hole in an axial direction;
an oil-supply channel for supplying lubricant oil to a sliding portion of the thrust bearing which makes slide contact with the first end surface of the flange portion; and
an oil-drain space forming member disposed on a side of a first end surface of the thrust bearing, the oil-drain space forming member defining an oil-drain space through which the lubricant oil leaking from the sliding portion of the thrust bearing flows, between the thrust bearing and the oil-drain space forming member,
wherein the oil-drain space includes:
an oil-drain channel defined between the first end surface of the thrust bearing and a first end surface of the oil-drain space forming member, the oil-drain channel surrounding the flange portion of the collar member; and
an oil-drain port formed below the oil-drain channel, for discharging the lubricant oil flowing through the oil-drain channel outside the oil-drain space,
wherein the oil-drain space forming member at least comprises a body portion including:
a center hole into which the collar body portion of the collar member mounted to the rotor shaft is inserted;
an inner peripheral edge portion which makes slide contact with a second end surface of the flange portion of the collar member at a radially outer side of the center hole;
an intermediate portion formed on a radially outer side of the inner peripheral edge portion, with a gap from the first end surface of the thrust bearing; and
an outer peripheral edge portion configured to make contact with the first end surface of the thrust bearing at a radially outer side of the intermediate portion,
wherein the oil-dram port is formed by a portion at a lower end body portion, the portion not having the outer peripheral edge portion formed thereon, and
wherein the outer peripheral edge portion includes:
an arc shaped portion extending in an arc shape from an upstream edge of the outer peripheral edge portion toward a predetermined position upstream of the oil drain-port in the rotational direction, and
a linear portion extending from the predetermined position in the arc-shaped portion to the oil-drain port along a tangent direction at the predetermined position.

2. The oil-drain device for a thrust bearing according to claim 1, further comprising a retainer disposed on a side of a second end surface of the oil-drain space forming member, and configured to retain the oil-drain space forming member and the thrust bearing on a radially outer side of the rotor shaft, and
wherein the retainer includes an inclined surface below the oil-drain port, the inclined surface extending obliquely downward toward the thrust bearing.

3. The oil-drain device for a thrust bearing according to claim 1,
wherein the intermediate portion of the oil-drain space forming member includes a recessed portion configured such that a gap from the first end surface of the thrust bearing is greater at the recessed portion than at other part of the intermediate portion, and
wherein the oil-drain channel includes an oil-drain groove extending in a circumferential direction formed by the recessed portion.

4. The oil-drain device for a thrust bearing according to claim 3,
wherein the oil-drain space forming member further includes a plurality of guide plates disposed at intervals in a circumferential direction inside the oil-drain channel, for guiding the lubricant oil flowing through the oil-drain channel to the oil-drain groove.

5. The oil-drain device for a thrust bearing according to claim 4,
wherein the guide plates extend radially inward from a peripheral edge portion of the oil-drain space forming member,
wherein leading edges of the guide plates are disposed closer to the thrust bearing than trailing edges of the guide plates, and
wherein an intersection between each of the leading edges and the peripheral edge portion is positioned upstream, in the flow direction, of an intersection between a corresponding one of the trailing edges and the peripheral edge portion.

6. The oil-drain device for a thrust bearing according to claim 1,
wherein the oil-drain space forming member has a second oil-drain port communicating with the oil-drain channel and is configured such that the lubricant oil flowing through the oil-drain channel is discharged outside the oil-drain space via the second oil-drain port.

7. The oil-drain device for a thrust bearing according to claim 6,
wherein the second oil-drain port has an opening which faces the flow direction of the lubricant oil flowing through the oil-drain channel, at an upper part of the oil-drain space forming member.

8. The oil-drain device for a thrust bearing according to claim 1,
wherein a groove portion extending in a circumferential direction is formed on the first end surface of the thrust bearing at a position radially outside an outer peripheral end surface of the flange portion, and
wherein the first end surface of the thrust bearing comprises an outer first end surface disposed on a radially outer side of the groove portion and an inner first end surface disposed on a radially inner side of the groove portion, the outer first end surface protruding toward the oil-drain space forming member to be closer to the oil-drain space forming member than the inner first end surface.

9. The oil-drain device or a thrust bearing according to claim 1,
wherein the oil-drain port is formed in an upstream region, in the rotational direction, of a centerline extending in an upward and downward direction through a rotational center of the rotor shaft.

10. The oil-drain device for a thrust bearing according to claim 1,
wherein the oil-drain space forming member comprises:
a body portion including:
a center hole into which the collar body portion of the collar member mounted to the rotor shaft is inserted;
an inner peripheral edge portion which makes slide contact with a second end surface of the flange portion of the collar member at a radially outer side of the center hole;
an intermediate portion formed on a radially outer side of the inner peripheral edge portion, with a gap from the first end surface of the thrust bearing; and
an outer peripheral edge portion configured to make contact with the first end surface of the thrust bearing at a radially outer side of the intermediate portion; and
a tongue portion extending obliquely downward from a lower end of the body portion toward the thrust bearing,
wherein the oil-drain port is formed by a portion of the lower end of the body portion, the portion not having the outer peripheral edge portion formed thereon,
wherein the tongue portion includes a bend portion bended to close the oil-drain port in a downstream region, in the rotational direction, of the center line.

11. The oil-drain device for a thrust bearing according to claim 1,
wherein the oil-drain channel is formed to have a flow-path cross sectional area which increases in the rotational direction from an upstream edge toward a downstream edge of the outer peripheral edge portion.

12. The oil-drain device for a thrust bearing according to claim 1,
wherein the oil-drain space forming member comprises an oil deflector formed from sheet metal.

13. A turbocharger, comprising:
a turbine impeller disposed on an end side of the rotor shaft;
a compressor impeller disposed on another end side of the rotor shaft; and
the oil-drain device for a thrust bearing according to claim 1.

14. An oil-drain device for a thrust bearing comprising, a rotor shaft;
a collar member to be mounted to an outer periphery of the rotor shaft so as to be rotatable with the rotor shaft, the collar member having a collar body portion having a cylindrical shape and a flange portion formed to have a larger diameter than the collar body portion;
a thrust bearing having an insertion hole into which the rotor shaft is inserted, the thrust bearing being configured to make slide contact with a first end surface of the flange portion of the collar member to support the rotor shaft which rotates in a state of being inserted into the insertion hole in an axial direction;
an oil-supply channel for supplying lubricant oil to a sliding portion of the thrust bearing which makes slide contact with the first end surface of the flange portion; and
an oil-drain space forming member disposed on a side of a first end surface of the thrust bearing, the oil-drain space forming member defining an oil-drain space through which the lubricant oil leaking from the sliding portion of the thrust bearing flows, between the thrust bearing and the oil-drain space forming member,
wherein the oil-drain space includes:
an oil-drain channel defined between the first end surface of the thrust bearing and a first end surface of the oil-drain space forming member, the oil-drain channel surrounding the flange portion of the collar member; and
an oil-drain port formed below the oil-drain channel, for discharging the lubricant oil flowing through the oil-drain channel outside the oil-drain space,
wherein the oil-drain space forming member comprises:
a body portion including:
a center hole into which the collar body portion of the collar member mounted to the rotor shaft is inserted;
an inner peripheral edge portion which makes slide contact with a second end surface of the flange portion of the collar member at a radially outer side of the center hole;
an intermediate portion formed on a radially outer side of the inner peripheral edge portion, with a gap from the first end surface of the thrust bearing; and
an outer peripheral edge portion configured to make contact with the first end surface of the thrust bearing at a radially outer side of the intermediate portion; and
a tongue portion extending obliquely downward from a lower end of the body portion toward the thrust bearing,
wherein the oil-drain port is formed by a portion of the lower end of the body portion, the portion not having the outer peripheral edge portion formed thereon, and
wherein the tongue portion is formed so as to increase a height of the oil-drain port from a side of a downstream edge toward a side of an upstream edge gradually, the height of the oil-drain port being defined as a vertical distance between the thrist bearing and the tongue portion.

15. A turbocharger, comprising:
a turbine impeller disposed on an end side of the rotor shaft;
a compressor impeller disposed on another end side of the rotor shaft; and
the oil-drain device for a thrust bearing according to claim 14.

* * * * *